United States Patent
Tucker et al.

(10) Patent No.: US 12,046,983 B2
(45) Date of Patent: *Jul. 23, 2024

(54) MOTOR WITH ROTATION SENSOR

(71) Applicant: Nidec Motor Corporation, St. Louis, MO (US)

(72) Inventors: John M. Tucker, St. Louis, MO (US); Philip S. Johnson, Granite City, IL (US)

(73) Assignee: Nidec Motor Corporation, St. Louis, MO (US)

( * ) Notice: Subject to any disclaimer, the term of this patent is extended or adjusted under 35 U.S.C. 154(b) by 330 days.

This patent is subject to a terminal disclaimer.

(21) Appl. No.: 17/532,420

(22) Filed: Nov. 22, 2021

(65) Prior Publication Data
US 2022/0085692 A1 Mar. 17, 2022

Related U.S. Application Data

(63) Continuation of application No. 16/368,314, filed on Mar. 28, 2019, now Pat. No. 11,218,054.

(51) Int. Cl.
| | |
|---|---|
| H02K 7/116 | (2006.01) |
| H02K 1/16 | (2006.01) |
| H02K 1/28 | (2006.01) |
| H02K 11/215 | (2016.01) |
| H02K 11/33 | (2016.01) |

(52) U.S. Cl.
CPC ............ *H02K 7/116* (2013.01); *H02K 1/165* (2013.01); *H02K 1/28* (2013.01); *H02K 11/215* (2016.01); *H02K 11/33* (2016.01)

(58) Field of Classification Search
CPC ...... H02K 7/116; H02K 11/215; H02K 11/33; H02K 1/165; H02K 1/28
See application file for complete search history.

(56) References Cited

U.S. PATENT DOCUMENTS

| | | | | |
|---|---|---|---|---|
| 5,631,511 | A | * 5/1997 | Schulmann | ............... F16H 1/32 |
| | | | | 310/78 |
| 6,310,455 | B1 | * 10/2001 | Siraky | .................... H02K 11/33 |
| | | | | 318/560 |

(Continued)

FOREIGN PATENT DOCUMENTS

CN 108494203 A * 9/2018 ............. H02K 1/278

*Primary Examiner* — Forrest M Phillips
(74) *Attorney, Agent, or Firm* — Hovey Williams LLP

(57) ABSTRACT

A gearmotor includes a motor assembly, a gear assembly, and an electronics assembly. The motor assembly includes a rotor including a rotor shaft; a stator; and a stator retention apparatus. The stator includes a core defining a core orientation feature, and a plurality of coils. The stator retention apparatus includes an apparatus orientation feature and an electronics assembly support structure. The gear assembly includes an output shaft. The electronics assembly includes a rotor shaft rotation sensor that is radially spaced from a rotor shaft position indicium, an output shaft rotation sensor that is radially spaced from an output shaft position indicium, and a magnetic sensor mounted to the electronics assembly support structure. The core orientation feature and the apparatus orientation feature engage one another to position the stator retention apparatus radially and arcuately relative to the core, such that the magnetic sensor is positioned adjacent an axial coil margin.

21 Claims, 21 Drawing Sheets

(56) References Cited

U.S. PATENT DOCUMENTS

| | | | | |
|---|---|---|---|---|
| 7,409,891 | B2* | 8/2008 | Takemura | H02K 41/06 |
| | | | | 74/640 |
| 11,218,054 | B2* | 1/2022 | Tucker | H02K 11/33 |
| 2007/0252541 | A1* | 11/2007 | Hazelton | H02K 29/08 |
| | | | | 318/400.38 |
| 2011/0116962 | A1* | 5/2011 | Kanayama | H02K 11/21 |
| | | | | 418/191 |
| 2014/0021831 | A1* | 1/2014 | Hayashi | H02K 11/30 |
| | | | | 310/432 |
| 2017/0057095 | A1* | 3/2017 | Oestergaard | B25J 13/088 |

* cited by examiner

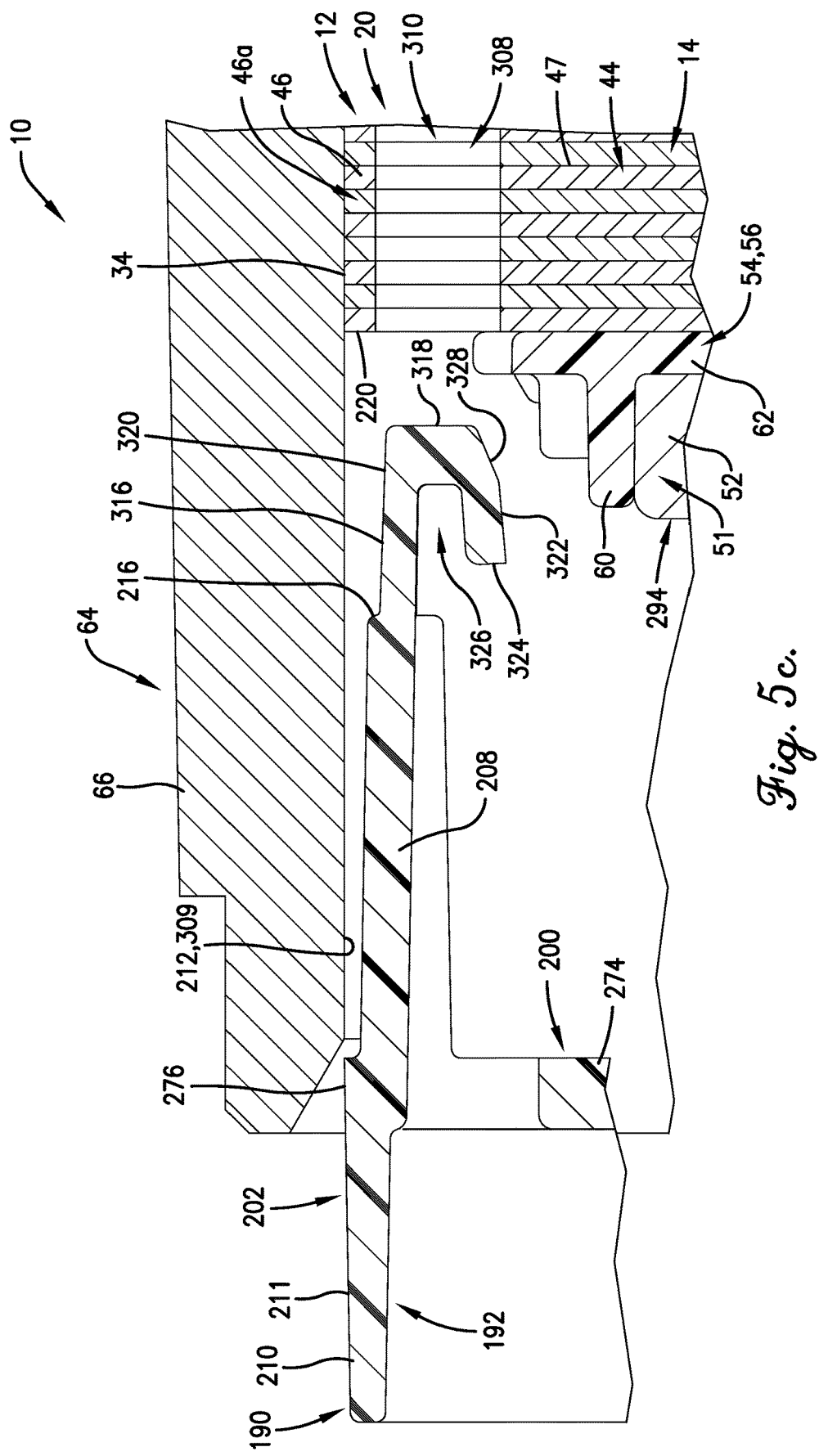

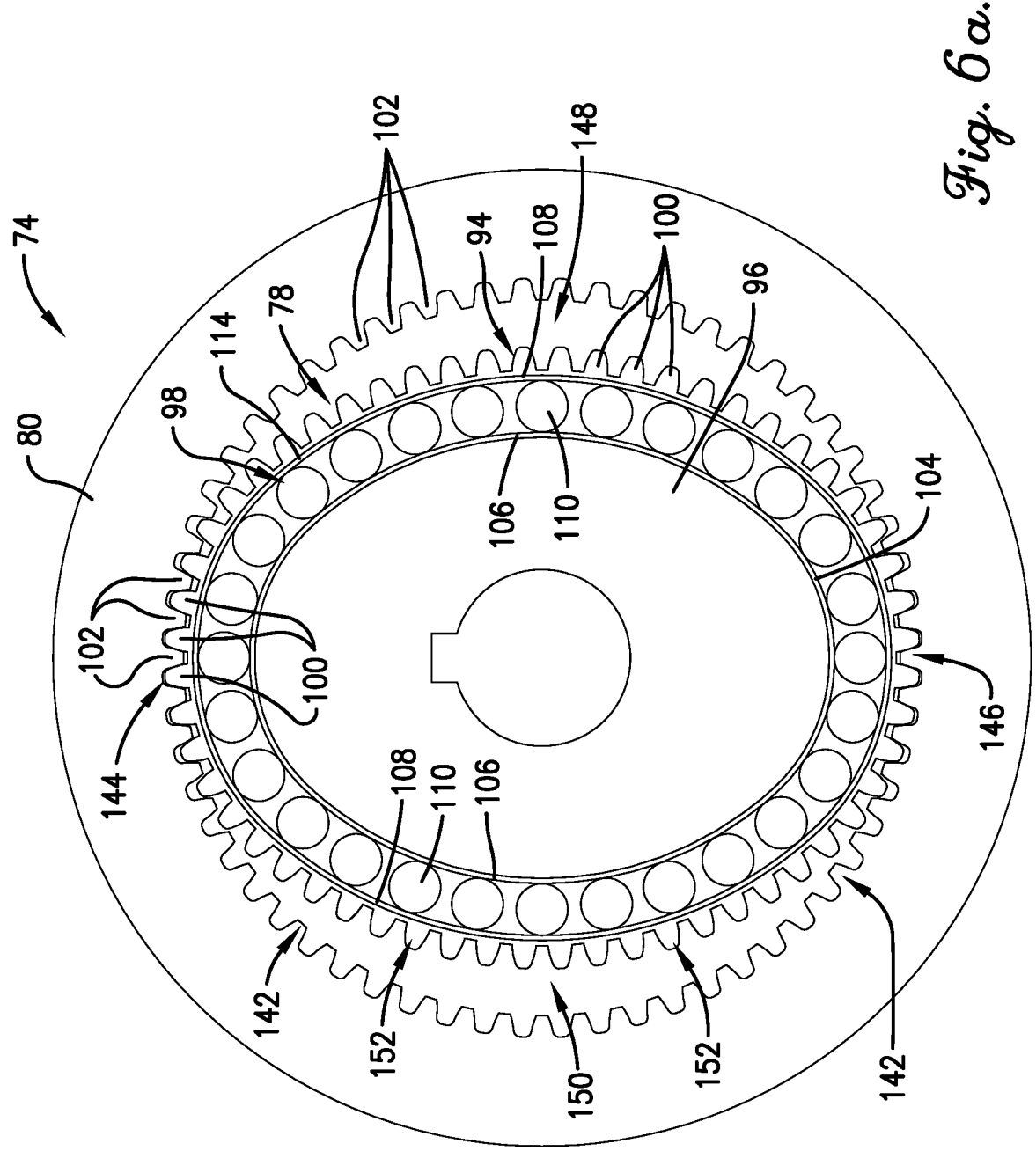

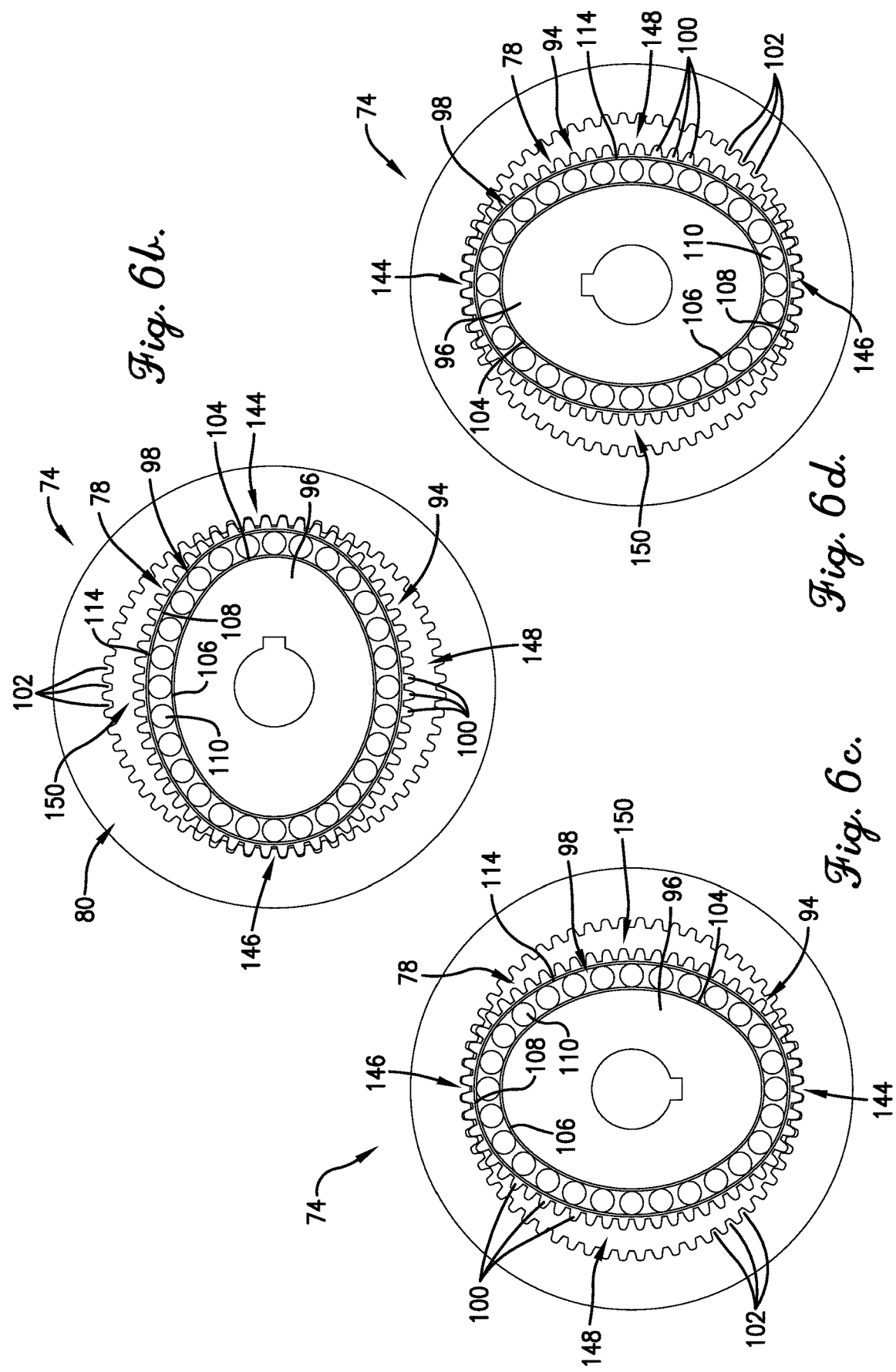

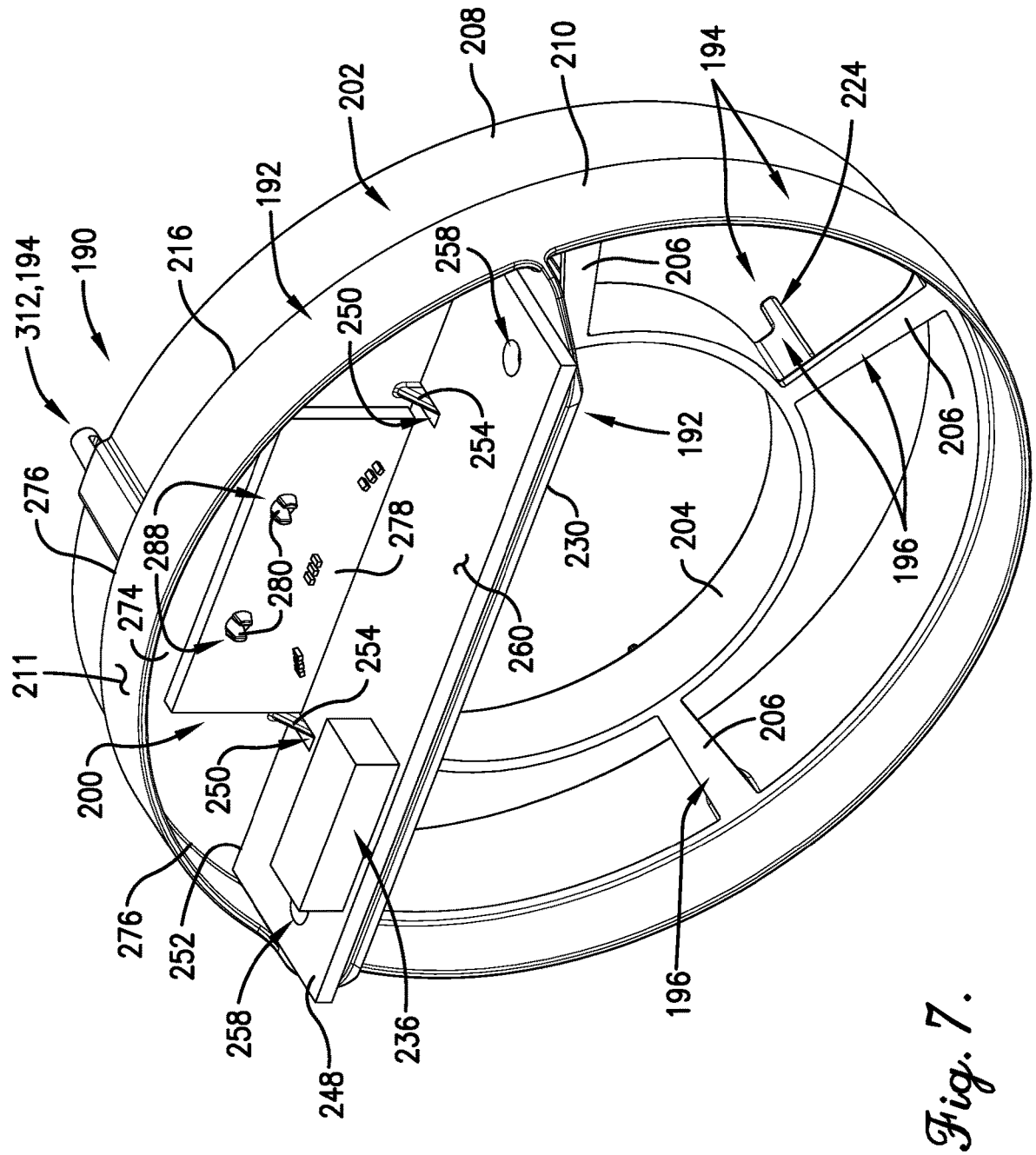

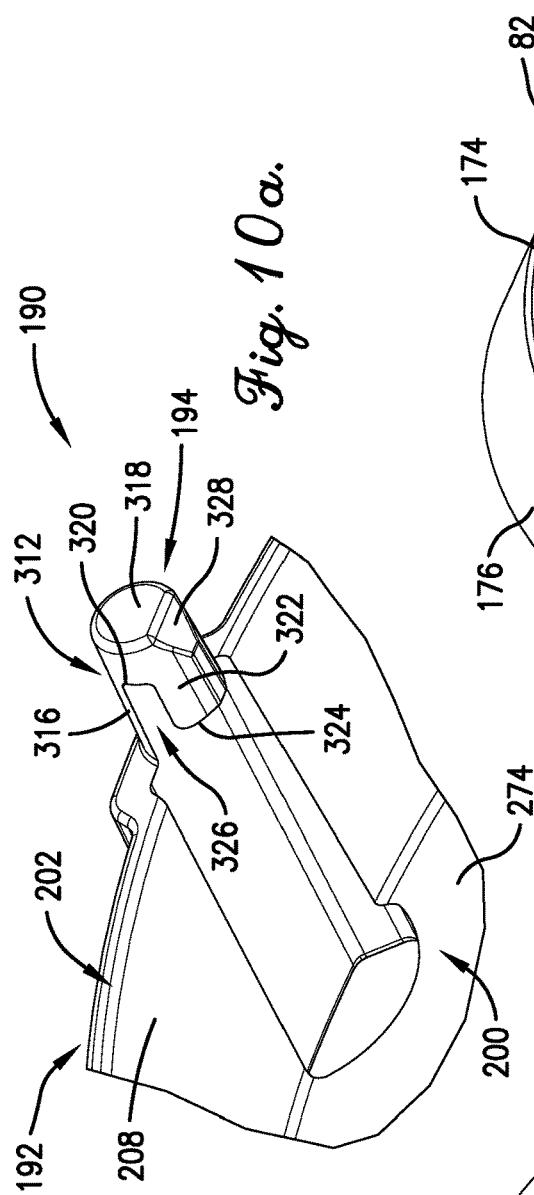
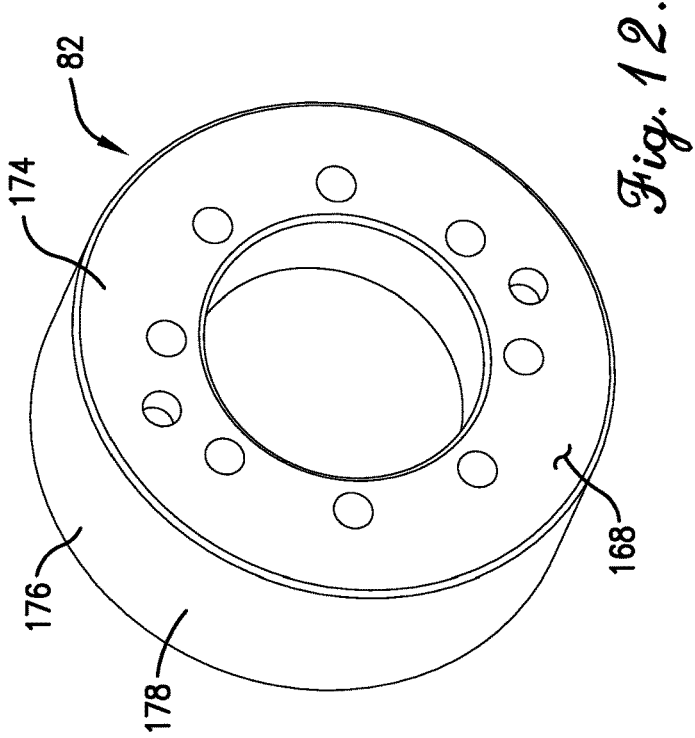
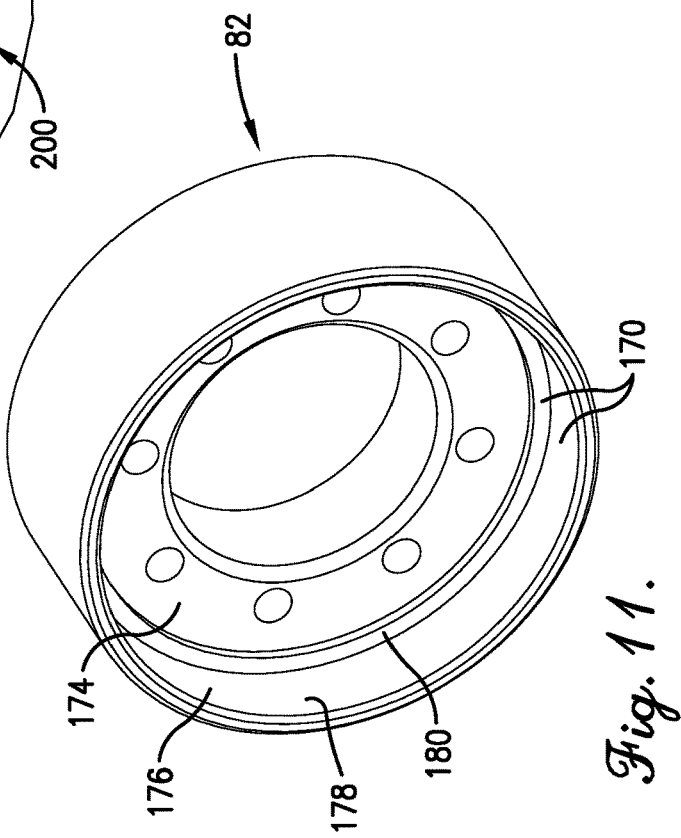

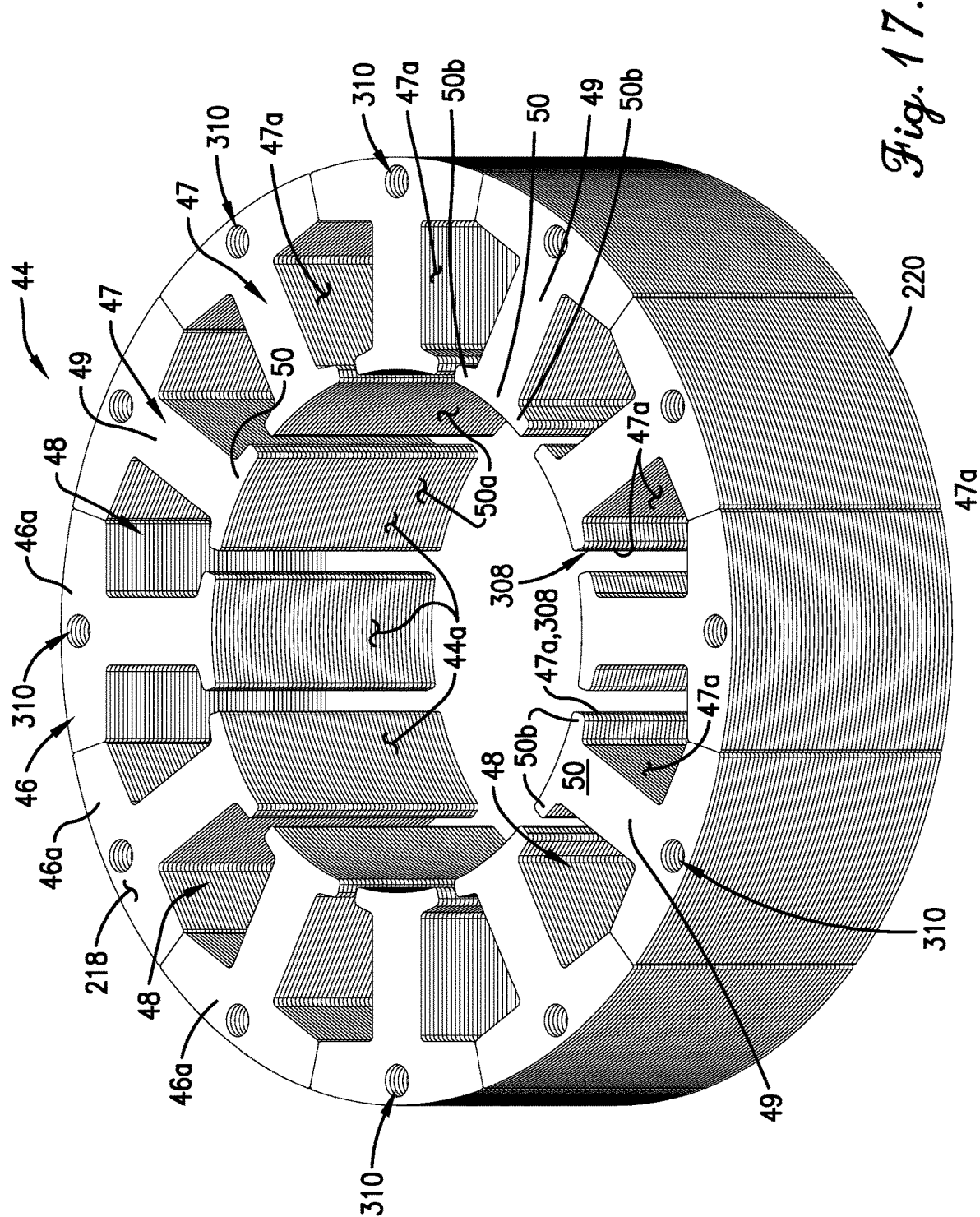

MOTOR WITH ROTATION SENSOR

CROSS-REFERENCE TO RELATED APPLICATIONS

1. Contemporaneously Filed Applications

This is a continuation of U.S. patent application Ser. No. 16/368,314, filed Mar. 28, 2019, which was filed contemporaneously with U.S. patent application Ser. No. 16/368,284, entitled COMPACT HIGH TORQUE, LOW SPEED GEARMOTOR, the entire disclosure of each of which is hereby incorporated by reference herein.

BACKGROUND OF THE INVENTION

1. Field of the Invention

The present invention relates to a motor including a gear assembly and an electronics assembly.

2. Discussion of the Prior Art

Those of ordinary skill in the art will appreciate that prior art motors faced with space constraints struggle to minimize overall motor outer diameter without detrimental effects on performance. Prior art motors also struggle to reduce numbers of components and their complexity. Still further, prior art motors struggle to provide efficient, accurate, and precise means of positioning sensors relative to sensed elements, both to reduce assembly times and to increase data quality.

SUMMARY

According to one aspect of the present invention, a gearmotor is provided. The gearmotor includes a motor assembly, a gear assembly, and an electronics assembly. The motor assembly includes a rotor. The rotor includes a rotor shaft rotatable about an axis, and a rotor shaft position indicium. The gear assembly includes an output shaft rotatable about the axis, and an output shaft position indicium. One of the rotor shaft and the output shaft circumscribes the other of the rotor shaft and the output shaft. The electronics assembly includes a rotor shaft rotation sensor and an output shaft rotation sensor. The rotor shaft rotation sensor is radially spaced from the rotor shaft position indicium such that a radial rotor shaft sensor gap is formed therebetween. The output shaft rotation sensor is radially spaced from the output shaft position indicium such that a radial output shaft sensor gap is formed therebetween.

Among other things, radial spacing of the rotor shaft rotation sensor from the rotor shaft position indicium and of the output shaft rotation sensor from the output shaft position indicium enables a reduction in the complexity and number of parts associated with the sensing system and facilitates an overall smaller gearmotor outer diameter than would otherwise be achieved.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with regard to the attached drawing figures, wherein:

FIG. 5c is an exploded cross-sectional side view of the portion of the gearmotor shown in FIG. 5b, particularly illustrated the orientation peg in a non-compressed state;

FIG. 6a is a schematic rear view of the strain wave gear assembly and the ring gear of the gear system, with the hub and the deformable gear in a first position;

FIG. 6b is a schematic rear view of the strain wave gear assembly and the ring gear of the gear system, with the hub and the deformable gear in a second position;

FIG. 6c is a schematic rear view of the strain wave gear assembly and the ring gear of the gear system, with the hub and the deformable gear in a third position;

FIG. 6d is a schematic rear view of the strain wave gear assembly and the ring gear of the gear system, with the hub and the deformable gear in a fourth position;

FIG. 7 is a rear perspective view of the stator retention apparatus and electronics assemblies of the motor assembly of FIGS. 1-5;

FIG. 10a is an enlarged view of a portion of the stator retention apparatus of FIG. 10, particularly illustrating the orientation peg in non-compressed state;

FIG. 11 is a rear perspective view of the coupler of the gearmotor of FIGS. 1-5;

FIG. 12 is a front perspective view of the coupler of FIG. 11;

FIG. 17 is a perspective view of the stator core of the motor assembly of FIGS. 1-5.

Figure 1:
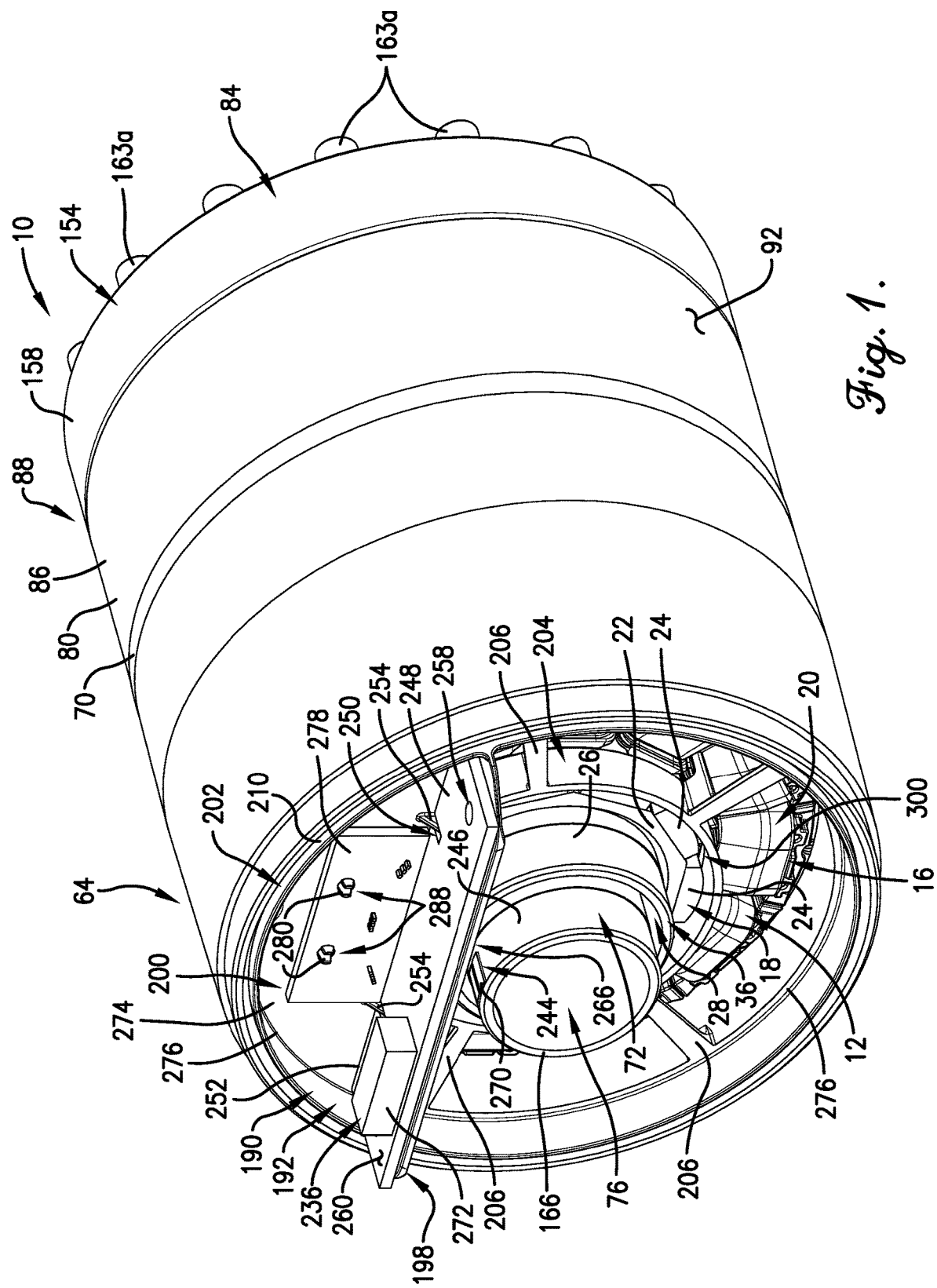
FIG. 1 is a rear perspective view of a gearmotor in accordance with a preferred embodiment of the present invention, with the dust cover removed for clarity.
Figure 2:
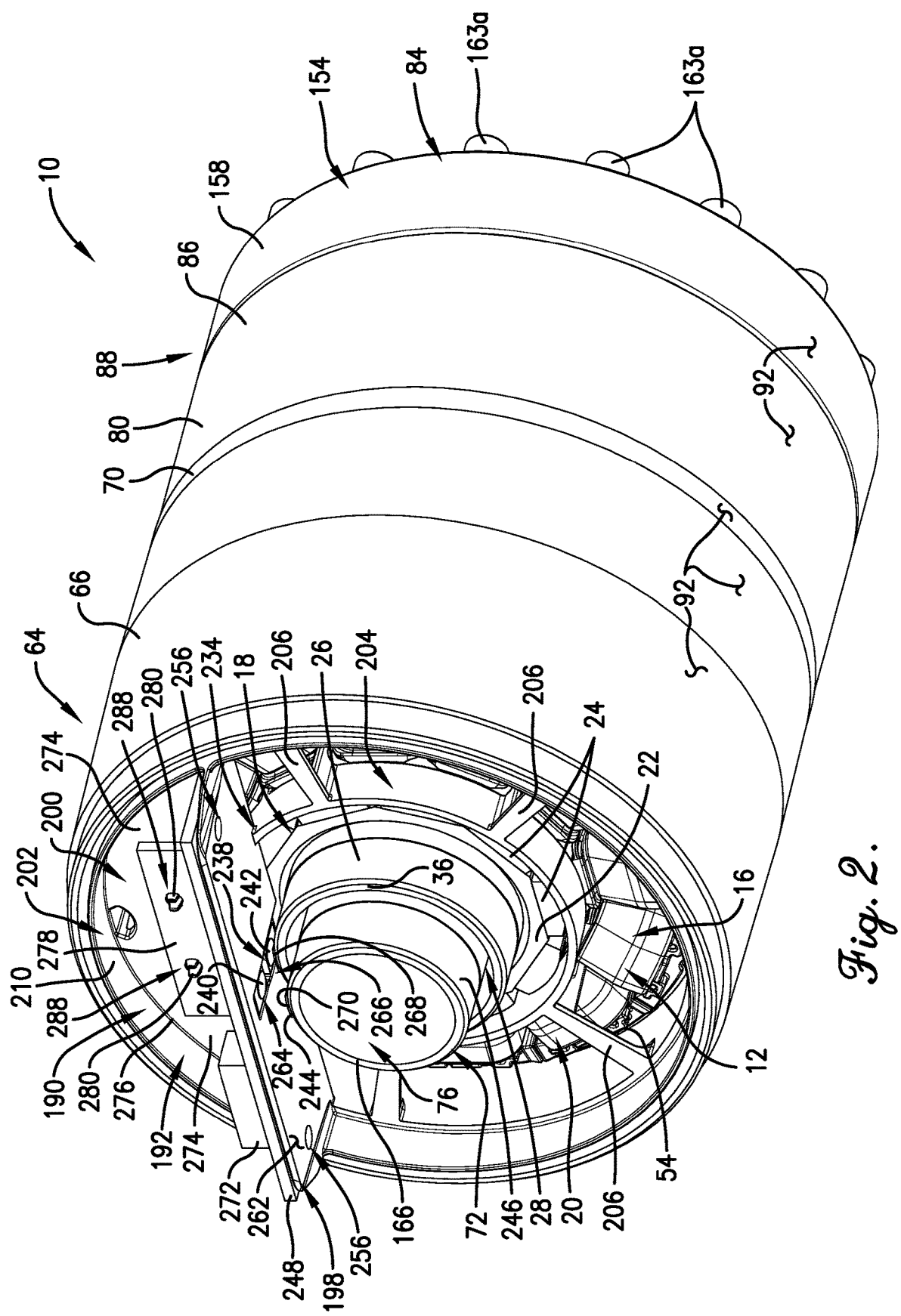
FIG. 2 is an alternative rear perspective view of the gearmotor of FIG. 1.
Figure 3:
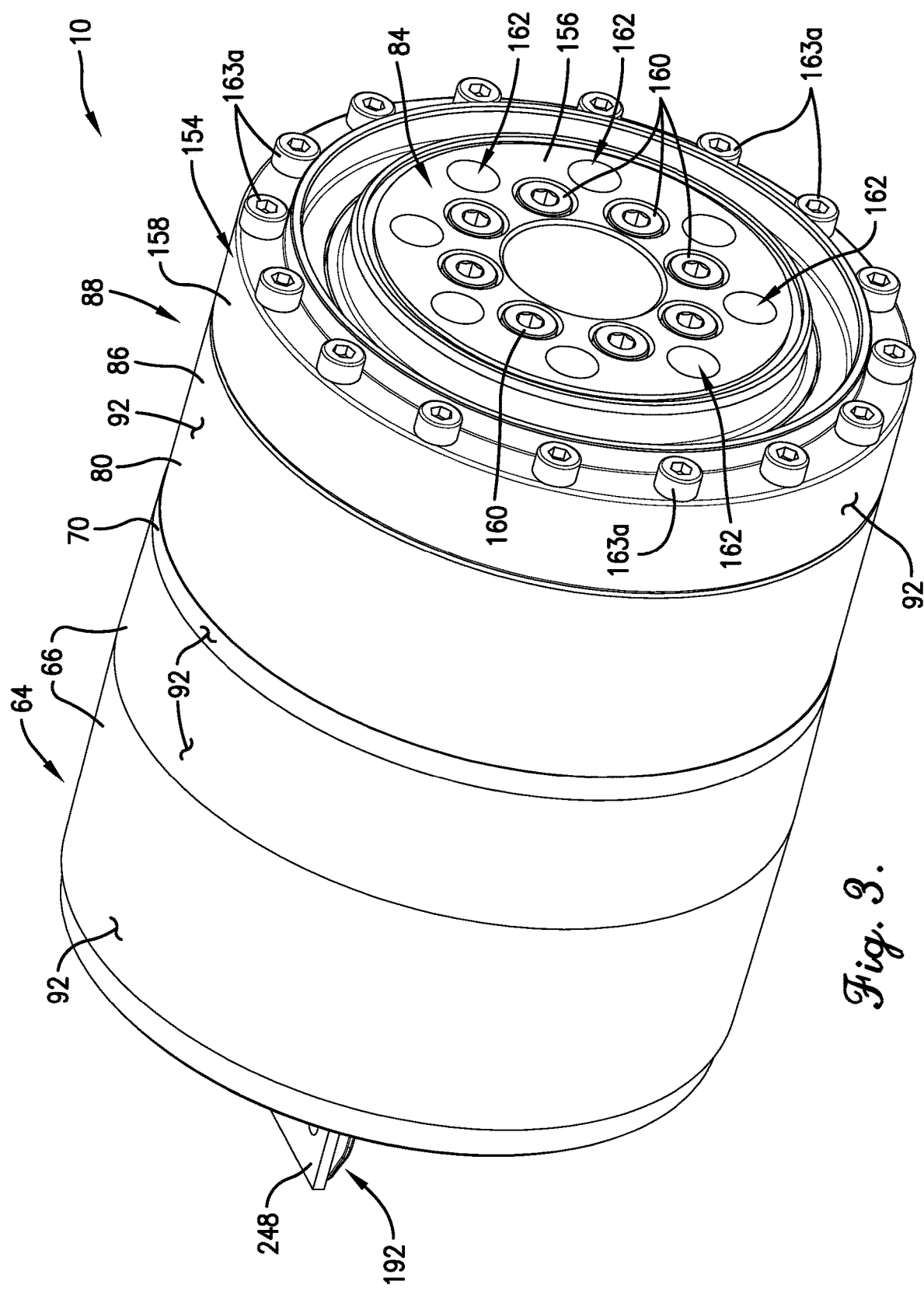
FIG. 3 is a front perspective view of the gearmotor of FIGS. 1 and 2.
Figure 4:
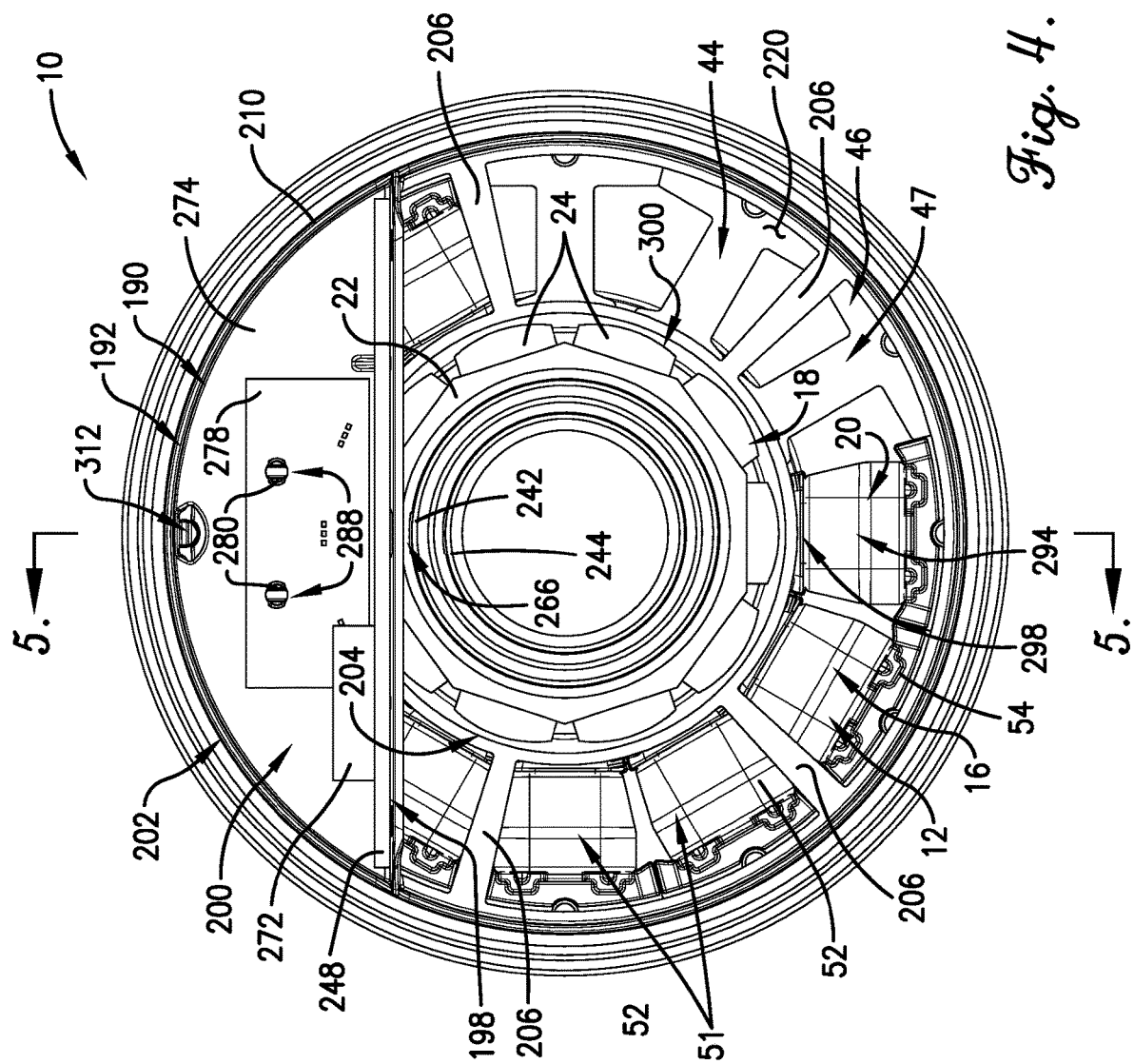
FIG. 4 is a rear view of the gearmotor of FIGS. 1-3.

The drawing figures do not limit the present invention to the specific embodiments disclosed and described herein. While the drawings do not necessarily provide exact dimensions or tolerances for the illustrated components or structures, the drawings are to scale with respect to the relationships between the components of the structures illustrated in the drawings.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (e.g., top, bottom, upper, lower, inner, outer, etc.) are used solely for the sake of convenience and should be understood only in relation to each other. For instance, a component might in practice be oriented such that faces referred to as "top" and "bottom" are sideways, angled, inverted, etc. relative to the chosen frame of reference.

Gearmotor Overview

In a preferred embodiment of the present invention, a gearmotor 10 is provided. The gearmotor 10 preferably includes a motor assembly 12 and a gear assembly 14.

The motor assembly 12 preferably includes motor 16 including a rotor 18 rotatable about an axis. The motor 16 further preferably includes a stator 20. The stator 20 preferably circumscribes the rotor 18, such that the motor 16 is an inner rotor motor. However, it is permissible according to some aspects of the present invention for the motor to instead be an outer rotor motor or a dual rotor motor. As will be discussed below, the motor 16 is preferably a brushless permanent magnet motor, although it is again permissible according to some aspects of the present invention for other motor types (e.g., induction motor) to be provided.

The rotor 18 preferably broadly includes a generally toroidal rotor core 22 and a plurality magnets 24 fixed to the rotor core 22. Most preferably, ten (10) magnets 24 are provided, although other numbers of magnets (or poles) are permissible without departing from the scope of the present invention.

The rotor 18 further preferably includes a rotor shaft 26. The rotor shaft 26 is preferably hollow to define a rotor shaft lumen 28 extending axially therethrough. The rotor shaft 26 is preferably rotatably supported on first and second rotor bearings 30 and 32, as will be discussed in greater detail below, and rotates about the axis. As will also be discussed in more detail below, the rotor shaft 26 preferably includes axially spaced apart fore and aft ends 34 and 36, with fore and aft halves 38 and 40 of the rotor shaft 26 extending axially from respective ones of the ends 34 and 36 toward a midpoint 42.

The stator 20 preferably broadly includes a generally toroidal core 44 comprising an annular yoke 46 and a plurality of arcuately spaced part teeth 47 extending radially from the yoke 46. The core 44 preferably comprises a plurality of axially stacked laminations (not shown), although other core configurations fall within the scope of the present invention. Furthermore, in a preferred embodiment, the core 44 includes a yoke segment 46a corresponding to each tooth 47. That is, the yoke 46 comprises a plurality of segments 46a, each of which corresponds to one of the teeth 47. However, the core could alternatively be unitarily formed or comprise a plurality of interconnected arcuate segments each comprising a plurality of teeth and/or a plurality of yoke segments.

Each pair of adjacent teeth 47 preferably defines a slot 48 therebetween. Preferably, the stator core 44 includes twelve (12) teeth 47, such that twelve (12) slots 48 are defined. However, it is permissible according to some aspects of the present invention for the number of teeth and, in turn, the number of slots, to vary.

Preferably, in keeping with a preferred inner rotor motor design, the teeth 47 extend radially inwardly from the yoke 46, although it is permissible according to some aspects of the present invention for the teeth to extend generally outwardly (e.g., in the case of an outer rotor motor).

Each tooth 47 preferably includes a generally radially extending arm 49 and a generally arcuately extending crown 50 extending from one end (in the present embodiment, a radially inner end) of the arm 49.

Each crown 50 preferably presents a circumferential crown face 50a spaced opposite the yoke 46. The circumferential crown faces 50a preferably cooperatively define an inner radial surface 44a of the stator core 44. The inner radial surface 44a of the stator core 44 is thus preferably discontinuous.

Each crown 50 preferably includes a pair of arcuately spaced apart, endmost tips 50b. The tips 50b and the arms 49 cooperatively present a pair of arcuately spaced apart tooth side faces 47a for each tooth 47, with the side faces 47a along the arms 51 at least substantially defining the slots 48.

As noted previously, although the above-described inner rotor motor design is preferred, it is permissible according to some aspects of the present invention for the motor to alternatively be an outer rotor motor. In such an alternative embodiment, the teeth would instead extend generally radially outwardly from yoke, with the crown faces therefore cooperatively defining a discontinuous outer radial surface of the stator core. In an alternative dual rotor motor design, teeth would extend both generally radially inwardly and generally radially outwardly from the yoke, with both the inner and outer radial surfaces of the stator core being discontinuous.

The stator 20 preferably includes a plurality of coils 51 wound about the core 44. The coils 51 preferably comprise electrically conductive wiring 52 wound about the core 44. The wiring 52 is preferably wound about each of the teeth 47 through the slots 48 to form the coils 51, with each of the coils 51 corresponding to one of the teeth 47. More particularly, the wiring 52 is preferably wound about each arm 49 so as to encircle the arm 49 with loops of wiring 52 that form the coils 51. Connecting portions 52a of the wiring 52 preferably extend between and interconnect selected ones of the coils 51, in keeping with an appropriate winding pattern and as will be readily understood by those of ordinary skill in the art. Furthermore, alternative winding patterns deviating from that described above are permissible without departing from the scope of the present invention.

In a preferred embodiment, each tooth 47 of the stator core 40 is provided with insulative structure 54 that electrically shields the stator core 40 from the coils 51. The insulative structure 54 preferably comprises a plurality of endcaps 56, each of which includes a flared radially innermost portion 58, a generally flat radially outermost portion 60, and a radially extending interconnecting portion 62 extending between and interconnecting the innermost and outermost portions 58 and 60, respectively. Each endcap 56 overlies a portion of a corresponding one of the stator teeth 47, with the interconnecting portion 62 being disposed between the tooth 47 and the corresponding coil 51, and with a pair of endcaps 56 cooperatively at least substantially encircling the associated tooth 47. Alternate forms of insulation, including but not limited to powder coating, inserts, or overmolding, may be provided in addition to or in lieu of endcaps without departing from the scope of the present invention. It is also permissible for insulation to be omitted entirely.

The gearmotor 10 further preferably includes a motor housing 64 at least substantially enclosing the motor assembly 12. In a preferred embodiment, for instance, the housing 64 includes a generally cylindrical shell 66, an external dust cover 68, and an internal endshield 70. It is also permissible according to some aspects of the present invention for additional components, such as a mounting flange, to be present. However, minimization of the overall gearmotor envelope through minimization of the housing outer diameter is most preferred. In other words, radially outwardly projecting mounting flanges, though permissible according to some aspects of the present invention, are generally undesirable.

The gear assembly 14 preferably broadly includes an output shaft 72 and a gear system 74. The gear system 74 is configured to transmit rotation from the rotor shaft 26 to the output shaft 72. The output shaft 72 preferably rotates about the same axis as the rotor shaft 26, although offset arrangements (including parallel and non-parallel axes) are permissible according to some aspects of the present invention. Most preferably, the output shaft 72 extends through the rotor shaft lumen 28, such that the rotor shaft 26 circumscribes (or at least substantially circumscribes) the output shaft 72. It is permissible according to some aspects of the present invention, however, for the output shaft to instead circumscribe the rotor shaft. Still further, it is permissible in some embodiments of the present invention for the preferred "telescoping" shaft arrangement to be omitted entirely.

The output shaft 72 is preferably hollow to define an output shaft lumen 76 extending axially therethrough. The output shaft lumen 76 is configured to efficiently and economically receive and guide wires (for example, control wires) through the output shaft 72 while reducing or eliminating wire holes through components of the motor assembly 12 (e.g., wire holes through the stator and the endshield).

As will be discussed in greater detail below, the gear system 74 preferably includes a strain wave gear assembly 78, a ring gear 80, and a coupler 82. As will also be discussed in greater detail below, the gear assembly 14 further preferably includes an output flange 84 and a sidewall portion 86. The output flange 84, an outer portion of the ring gear 80, the sidewall portion 86, and the aforementioned interior endshield 70 cooperatively form a gear assembly housing 88 that defines a gear system chamber 90. Certain components of the gear system 74, including the strain wave gear assembly 78, an inner portion of the ring gear 80, and the coupler 82, are at least substantially received in the gear system chamber 90.

In a preferred embodiment, as illustrated, the ring gear 80 and the sidewall portion 86 are integrally formed with one another, although discrete formation is permissible without departing from the scope of the present invention.

The gear assembly housing 88 and the motor housing 64 preferably cooperatively define a radially outermost face 92 of the gearmotor 10, with the radially outermost face 92 defining a maximum gearmotor diameter which may in some instances vary axially. However, it is permissible according to some aspects of the present invention for mounting flanges or other structure to project radially outwardly from the motor housing, the gear housing, and/or a combination of the two housings. Again, however, it is most preferred to minimize the overall gearmotor radial envelope by omitting such projections.

Gear System

The gear system 74 is preferably configured to achieve significant speed reduction, produce high torque, and provide excellent precision, superb repeatability, and low backlash while maintaining a compact envelope.

More particularly, the strain wave gear assembly 78 includes a deformable gear 94, a cam or hub 96, and a gear bearing 98 disposed between and preferably engaging each of the hub 96 and the deformable gear 94. The deformable gear 94 preferably includes a plurality of radially outwardly projecting teeth 100. The ring gear 80 preferably includes a plurality of radially inwardly projecting ring gear teeth 102 configured to sequentially engage the teeth 100 of the deformable gear 94.

The hub 96 is preferably integrally formed with the rotor shaft 26, although non-integral means of fixation are permissible. Any such non-integral means of fixation preferably maintain rotational unison between the hub and the rotor shaft, although it falls within the scope of some aspects of the present invention for proportional but not one-to-one rotation to occur between the rotor shaft and the hub.

The hub 96 is preferably elliptical in form to present major and minor axes, although other shapes are permissible according to some aspects of the present invention. The hub 96 preferably presents an outer deformer face 104 that will be described in greater detail below.

The gear bearing 98 is preferably an elastic (i.e., deformable) ball bearing including a thin inner race 106, a thin outer race 108, and a plurality of spheres 110 disposed between the inner and outer races 106 and 108, respectively.

The deformable gear 94 is preferably in the general form of a cup.

More particularly, the deformable gear 94 preferably includes a disk-like, radially extending base 112 disposed orthogonally to the axis, and a circumferentially extending, cylindrical sidewall 114 extending axially from the base 112. The base 112 preferably defines an annular radially innermost margin 116 and an annular radially outermost margin 118. The innermost margin 116 preferably defines an orifice 120 that, in a preferred embodiment, is sized and shaped to at least substantially correspond to the cross-sectional size and shape of the aforementioned output shaft lumen 76. The sidewall 114 preferably extends from the outermost margin 118. More particularly, the sidewall 114 preferably includes axially spaced apart fore and aft ends 122 and 124, with the fore end 122 being disposed adjacent the outermost margin 118 of the base 112 and the aft end 124 being spaced axially therefrom. As will be discussed in greater detail below, however, it is permissible according to some aspects of the present invention for the base to be disposed intermediately along the sidewall. For instance, the base might be positioned halfway between the fore and aft ends of the sidewall such that the sidewall extends axially equidistantly in both fore and aft directions from the base. Non-centralized positioning (e.g., with a small portion of the sidewall extending in a fore direction from the base and a larger portion of the sidewall extending in an aft direction from the base) is also permissible according to some aspects of the present invention.

The sidewall 114 defines radially inner and outer faces 126 and 128, respectively, while the base 112 defines respective axially inner (aft) and outer (fore) faces 130 and 132. The inner face 126 of the sidewall 114 and the inner face 130 of the base 112 cooperatively define an interior space 134. Alternatively described, the interior space 134 is defined between the base 112 and the aft end 124 of the sidewall 114 (or between the fore and aft ends 122 and 124 of the sidewall 114).

As noted previously, the deformable gear 94 preferably defines a plurality of arcuately spaced apart teeth 100. In a preferred embodiment, as illustrated, the teeth 100 are formed on the radially outer face 128 of the sidewall 114 and project radially outwardly therefrom.

The base 112 is preferably relatively thick and rigid, whereas the sidewall 114 is preferably relatively thin and flexible, such that the sidewall 114 nearer the aft end 124 is significantly flexible. In contrast, connection to the rigid base 112 restricts flexing of the sidewall 114 nearer the fore end 122. In greater detail, the sidewall 114 preferably comprises a material and presents a sidewall thickness cooperatively conducive to substantially elastic behavior in a relevant strain range. It is also preferred that the sidewall 114 is preferably fairly easily deformable radially but torsionally very rigid.

In alternative embodiments such as those described above featuring an intermediately positioned base (e.g., in which the base is disposed between the ends of the sidewall rather than directly at the fore end), it is preferred that any necessary material, dimensional, etc. adjustments are made to the sidewall to ensure appropriate levels of flexibility near the aft end. That is, axial shortening of the portion(s) of the sidewall extending from the base will inherently decrease the flexibility of such portion(s) and, in some circumstances, may require mitigating changes to ensure proper functionality of the sidewall portion(s). (Details of such proper functionality will be described below.)

In a preferred embodiment, the sidewall 114 comprises an alloy steel. However, other materials fall within the scope of the present invention.

The teeth 100 of the deformable gear are preferably disposed immediately adjacent or at least near the aft end 124, with a fore portion 136 of the sidewall 114 being smooth (i.e., devoid of teeth). That is, the teeth 100 are preferably disposed along the most flexible/deformable portion of the sidewall 114. It is permissible according to some aspects of the present invention, however, for the teeth to be spaced from the aft end or to extend along the entire axial span of the sidewall.

As noted previously, the hub 96 is preferably elliptical in form. In an undeformed state, the inner and outer races 106 and 108 of the gear bearing 98 preferably extend along generally circular paths centered about the aforementioned motor and output shaft co-axes. However, upon assembly, the elliptical hub 96 is fitted securely into the inner race 106 in such a manner as to skew the gear bearing 98 into a generally complementary elliptical form. The inner and outer races 106 and 108 therefore preferably present respective generally smooth inner and outer engagement surfaces 138 and 140 that are at least substantially elliptical (to share the major and minor axes of the hub 96). That is, the inner engagement surface 138 of the gear bearing 98 conforms to the deformer face 104 of the hub 96, and the outer engagement surface 140 of the gear bearing 98 likewise deforms in a complementary (but larger-dimensioned) manner. It is also noted that the inner race 106 rotates with the hub 96, while the outer race 108 does not, due to the presence of the spheres 110.

In an undeformed state, the sidewall 114 of the deformable gear 94 is preferably right circular cylindrical about the shared axis of the rotor shaft 26 and the output shaft 72 and fits tightly over the outer race 108 of the gear bearing 98. However, after assembly, the smooth radially inner face 126, like the outer race 108, deforms into an elliptical form matching the hub 96. Like the outer race 108, the sidewall 114 does not rotate with the hub 96.

The ring gear 80 is preferably substantially rigid and presents an inner toothed surface 142 defining the previously mentioned arcuately spaced apart, radially inwardly projecting ring gear teeth 102. The ring gear teeth 102 are configured for engagement with the teeth 100 of the deformable gear 94. The inner toothed surface 142 preferably extends along a substantially circular path that is concentric with that of the undeformed sidewall 114 and gear bearing 98.

The ring gear 80 and the deformable gear 94 are complementarily sized, such that the deformable gear 94 in its deformed state (i.e., when assembled with the gear bearing 98 and the hub 96) engages the ring gear 80 at both ends of the major axis of the elliptically deformed sidewall 114. More particularly, the ring gear 80 preferably presents a slightly larger inner diameter than the outer diameter of the undeformed deformable gear.

In greater detail still, the deformable gear 94 in its deformed state preferably engages the ring gear 80 at two (2) diametrically opposed contact regions 144 and 146 defined at opposite ends of the major axis, such that corresponding ones of the teeth 100 of the deformable gear 94 engage corresponding ones of the ring gear teeth 102. As the hub 96 rotates, the particular subsets of teeth 100 and 102 that engage one another (i.e., the contact regions 144 and 146) change. That is, the contact regions 144 and 146 themselves rotate in coordination with rotation of the hub 96.

Due to the elliptical shape of the sidewall 114, gaps 148 and 150 are disposed between the contact regions 144 and 146 and extend between an outer toothed surface 152 defined by the teeth 100 of the deformable gear 94 and the inner toothed surface 142 of the ring gear 80. As will be apparent to those of ordinary skill in the art, maximum gap widths are thus defined along the minor axis of the ellipse. Furthermore, the gaps 148 and 150, like the contact regions 144 and 146, shift progressively arcuately as the hub 96 rotates and the sidewall 114 deforms.

Preferably, as noted above, the gear system 74 facilitates a reduction in rotational speed from the rotor shaft 26 to the output shaft 72. Such reduction is preferably accomplished by provision of fewer teeth 100 of the deformable gear 94 than ring gear teeth 102. That is, the deformable gear 94 includes fewer teeth 100 than the ring gear teeth 102 and therefore shifts a small amount in an opposite rotational direction for each full rotation of the hub 96.

Although the teeth 100 and 102 are simply illustrated schematically herein, in one permissible embodiment, the deformable gear 94 has two (2) fewer teeth 100 than the ring gear teeth 102. More particularly, the ring gear 80 includes two hundred two (202) teeth 102, while the deformable gear 94 includes two hundred (200) teeth 102. For each one hundred eighty (180) degree rotation of the hub 96 in a first rotational direction, the deformable gear 94 advances relative to the ring gear 80 in an opposite, second rotational direction by one ring gear tooth 47. Thus, each full rotation of the hub 96 results in an oppositely directed two (2)-tooth angular shift of the deformable gear 94 along the ring gear 80. For a deformable gear 94 comprising two hundred (200) teeth 100, one hundred (100) such two-tooth shifts are necessary for a complete rotation of the deformable gear 94. In other words, the hub 96 (or, the rotor shaft 26) must undergo one hundred (100) rotations in order for the deformable gear 94 to rotate a single time.

Such a configuration enables drastic downshifting of rotational speed. In a preferred embodiment, for instance, the rotor shaft 26 has an operational speed of three thousand (3,000) revolutions per minute (rpm), in contrast to the much slower three hundred (300) rpm speed of the deformable gear 94 and, in turn, the output shaft 72.

Broadly speaking, the gearing reduction ratio can be simply calculated as the number of teeth of the deformable gear minus the number of ring gear teeth, divided by the number of ring gear teeth. In the above, example, for instance, the number of teeth 100 of the deformable gear 94 minus the number of ring gear teeth 102 is two hundred (200) minus two hundred two (202), which equals negative two (−2). Negative two (−2) divided by the number of ring gear teeth 102 is negative two (−2) divided by two hundred (200), which equals negative one one-hundredth (−0.01). Thus, the deformable gear 94 rotates at one one-hundredth (¹⁄₁₀₀) the speed of the rotor shaft 26, and in an opposite direction.

It is also noted that continuous engagement of at least some of the teeth 100 of the deformable gear 94 with at least some of the ring gear teeth 102 eliminates or substantially eliminates backlash.

Additional details of strain-based gearing configurations such as that described above, as well as alternative strain-based gearing configurations, will be known to those of ordinary skill in the art. Furthermore, certain aspects of present invention are equally applicable to gearmotor assemblies using alternative gearing structures (e.g., planetary gears, etc.).

As described above the gear system 74 provide a speed reduction from the more rapidly rotating rotor shaft 26 to the more slowly rotating deformable gear. This slower rotation is preferably transmitted to the output shaft 72, as well.

More particularly, the coupler 82 is preferably disposed within the interior space 134 of the deformable gear 94 and is fixed to both the deformable gear 94 and the output shaft 72 to facilitate concurrent rotation of thereof. In a preferred embodiment, for instance, the coupler 82 at least substantially circumscribes the output shaft 72 and is fixed to the output shaft 72 to rotate therewith. The coupler 82 also abuts and is fixed to the base 112 of the deformable gear 94 to rotate therewith.

As noted previously, the gear assembly 14 preferably includes an output flange 84. In a preferred embodiment, as illustrated, the output flange 84 comprises a cross bearing 154, with the cross bearing 154 also cooperating with the motor housing 64 and the other previously described components of the gear assembly housing 88 to present the radially outermost face 92 of the gearmotor 10.

In a preferred embodiment, the cross bearing 154 in part radially overlaps the ring gear 80, the deformable gear 94, and the hub 96. More particularly, the cross bearing 154 includes an inner cross bearing race 156 and an outer cross bearing race 158. The outer cross bearing race 158 preferably has an at least substantially equal outer diameter and radial thickness as the ring gear 80 and is radially aligned therewith. The ring gear 80 and the outer cross bearing race 158 thus entirely or nearly entirely radially overlap one another. Similarly, the base 112 of the deformable gear 94 preferably has an at least substantially equal outer diameter and radial thickness to that of the inner cross bearing race 156. The base 112 and the inner cross bearing race 156 thus entirely or nearly entirely radially overlap on another. The hub 96 is spaced from the sidewall 114 of the deformable gear 94 and therefore has a smaller outer diameter than the base 112 (and inner cross bearing race 156), while also presenting a smaller radial thickness. The entirety of the hub 96 is thus overlapped by the inner cross bearing race 156 in the preferred, illustrated embodiment.

It is particularly noted that, in a conventional design, the cross bearing would instead be disposed entirely radially outside of the ring gear, leading to a larger overall gearmotor outer diameter.

Although the overlapped cross bearing configuration described in detail above is most preferred, it is particularly noted that other overlapped configurations/proportions fall within the scope of some aspects of the present invention, with the primary purpose of the preferred overlapping configuration being minimization of the overall gearmotor outer diameter. Provision of a radially thicker outer cross bearing race and a radially thinner inner cross bearing race, among numerous other modifications, could conceivably be made without jeopardizing this primary functionality.

As will be apparent from the above, the base 112 of the deformable gear 94 is preferably disposed axially between the coupler 82 and the cross bearing 154 and, more particularly, between the coupler 82 and the inner cross bearing race 156. At least one and preferably a plurality of coupling bolts 160 (or other fasteners such as pegs, screws, or latches) preferably interconnect the coupler 82, the base 112, and the inner cross bearing race 156. Thus, the inner cross bearing race 156 rotates (relatively slowly in comparison to the rotor shaft 26) in unison with the output shaft 72, the deformable gear 94, and the coupler 82.

As noted previously, the inner cross bearing race 156 is defined by the output flange 84. The output flange 84 is preferably configured to enable mounting of one or more external structures thereto, as required for a particular application. For instance, in the illustrated embodiment, a plurality of arcuately spaced apart output mounting holes 162 are provided through the inner cross bearing race 156, at least in part radially outside the bolts 160. A separate output flange of the type seen in conventional designs is therefore unnecessary. Mounting of the gearmotor 10 in the preferred illustrated embodiment may be achieved by use of mounting bolts 163a extending through mounting holes 163b defined by the outer cross bearing race 158 and the ring gear 80.

However, although the above-described output flange design is preferred, any of a variety of mounting concepts known in the art might be applied alternatively or in addition without departing from some aspects of the present invention.

It is also noted that the output shaft 72 presents axially spaced apart fore and aft ends 164 and 166. Preferably, the fore end 164 of the output shaft 72 is axially aligned with a fore face 168 of the coupler 82 such that the fore end 164 is received within the interior space 134 of the deformable gear 94. That is, the output shaft 72 does not extend axially through the entirety of the gear system 74 (i.e., does not extend through the cross bearing 154 or, alternatively stated, the output flange 84). Such a feature again facilitates minimization of the gearmotor envelope dimensions.

Rotor Bearing Disposition

The coupler 82 preferably acts both as a connecting element (as discussed above) and as a bearing seat. More particularly, the first rotor bearing 30 is preferably disposed in a first bearing seat 170 defined by the coupler 82. The second rotor bearing 32 is preferably disposed in a second bearing seat 172 defined by the endshield 70.

In greater detail still, the coupler 82 preferably includes an annular main body 174 that abuts the output shaft 72 and the base 112 of the deformable gear 94. A seating projection 176 extends axially away from the main body 174 and includes an outer wall 178 and a shelf 180 projecting radially inwardly from the outer wall 178. The first rotor bearing 30 includes an inner race 182 and an outer race 184. The inner race 182 of the first rotor bearing 30 engages the rotor shaft 26, while the outer race 184 of the first rotor bearing 30 engages the outer wall 178 and abuts the shelf 180.

The second rotor bearing 32 also includes inner and outer races 186 and 188, respectively. The inner race 186 engages the rotor shaft 26, while the outer race 188 engages the endshield 70.

The first rotor bearing 30 is preferably disposed in its entirety within the interior space 134 defined by the deformable gear 94. The hub 96 and the gear bearing 98 are likewise preferably disposed in their entirety within the interior space 134. (As noted previously, so too is the coupler 82.) Such an arrangement facilitates rotational support of the rotor shaft 26 and the output shaft 72 without or at least substantially without increasing the axial length of the gearmotor 10. Seating of the second rotor bearing 32 in the endshield 70 also facilitates a reduced axial length.

It is permissible according to some aspects of the present invention, however, for modified positioning to be provided. For instance, a portion of the hub or gear bearing might extend axially past the aft end of the sidewall, or the second rotor bearing might be in part disposed within the interior space. However, it is most preferred that any such alternate configurations nevertheless facilitate a compact axial gearmotor footprint.

Positioning of the first rotor bearing 30 within the interior space 134 and the second rotor bearing 32 in the endshield (instead of the rotor bearing being positioned at opposite fore and aft ends of the rotor shaft as in a conventional design) also enables a decreased overall gearmotor 10 outer diameter to be achieved. Such a decreased overall outer diameter is achievable even with diametrically large rotor and output shaft lumens 28 and 76, respectively, as compared to the typically smaller lumens of a conventional design. Such large lumens 28 and 76 are particularly advantageous in association with preferred multi-motor articulating robotic arm applications in which wiring for each subsequent more distal motor must be routed through the output shaft lumen(s) of more proximal motors. That is, substantial lumen space for wire routing is highly desirable.

As will be apparent from the above, it is also preferred that the hub 96 be disposed axially between the first and second rotor bearings 30 and 32, although arrangements in which both rotor bearings are disposed on one side of the hub are permissible according to some aspects of the present invention.

It is also noted that the first and second rotor bearings 30 and 32 are preferably disposed along only a single one of the rotor shaft halves 38 and 40. In a most preferred embodiment, for instance, the first and second rotor bearings 30 and 32 are each disposed along the fore half 38 of the rotor shaft 26. (The rotor core 22 and magnets 24 are preferably disposed on the other of the shaft halves or, in the illustrated embodiment, the aft half 40.) Even more preferably, the rotor bearings 30 and 32 are spaced along only about a foremost third or less of the rotor shaft 26.

Still further, it is noted that a conventional motor design requires at least four (4) bearings associated with the rotating shafts, in contrast to the two (2) rotor bearings 30 and 32 of the present design.

Stator Retention Apparatus Overview

The motor assembly 12 preferably includes a multifunctional stator retention apparatus 190. As will be discussed in greater detail below, the stator retention apparatus 190 preferably includes an arcuately extending ring portion 192. The stator retention apparatus 190 further preferably includes a plurality of orientation features 194, a wire management structure 196, and first and second electronics mounting structures 198 and 200, all of which are preferably fixed to the ring portion 192. More particularly, these features and structures 194, 196, 198, and 200 are all preferably integrally formed with the ring portion 192 (e.g., via a molding process), although one or more of the features and/or structures might alternatively be discretely formed and secured to the ring portion by means including but not limited to adhesives or glues; interlocking and/or interengaging components such as latches, dovetails, and/or integrally formed threads; discrete fasteners such as bolts or screws; and heat bonding (e.g., melting or welding).

The stator retention apparatus 190 preferably comprises an electrically insulative or substantially electrically insulative material, such as a synthetic resin. Other materials may be additionally or alternatively used without departing from the scope of some aspects of the present invention, however. It is also possible for the stator retention apparatus to comprise an electrically conductive material (e.g., steel) coated or otherwise covered in whole or in part with an insulative material (e.g., via dipping or powder coating). Still further, the material forming the stator retention apparatus may vary from one section to another. For instance, the ring portion might in some embodiments comprise a different material than the electronics mounting structures, the wire management structure, and/or the orientation feature.

Stator Retention

The ring portion 192 (and likewise the stator retention apparatus 190 in a broad sense) is preferably generally annular. Most preferably, the ring portion 192 extends continuously to form a closed ring or loop, although discontinuities and/or spaced apart terminal ends are permissible according to some aspects of the present invention. The ring portion 192 is preferably circularly annular in keeping with the shape of the previously described shell 66. However, alternative shapes are also permissible according to some aspects of the present invention.

The ring portion 192 preferably broadly includes an outer annulus 202, an inner annulus 204 at least substantially circumscribed by the outer annulus 202, and a plurality of generally radially extending struts 206 extending between and interconnecting the inner and outer annuli 202 and 204. The struts 206 are preferably distributed about only a portion of the circumferential extent of the ring portion 192 and are evenly spaced apart along such extent. However, it is permissible according to some aspects of the present invention for uneven distribution or distribution along the entirety of the ring portion to be present.

In a preferred embodiment, the outer annulus 202 presents a fore portion 208 nearer the gear system 74 and an aft portion 210 nearer the dust cover 68. The aft portion 210 preferably presents a larger outer diameter than that of the fore portion 208 and presents a circumferentially extending outer retention surface 211 that engages an inner surface 212 of the motor shell 66 (e.g., in an interference fit, tight fit, etc.). In contrast, the fore portion 208 is preferably sized such that a circumferential gap 214 is defined between the fore portion 208 and the inner surface 212 of the shell 66, although omission of the gap falls within the scope of some aspect of the present invention.

In a preferred embodiment, the fore portion 208 presents a circumferentially and radially extending, axially facing abutment face 216. The stator core 40 preferably presents axially spaced apart fore and aft end faces 218 and 220. The abutment face 216 preferably abuts the aft end face 220 of the stator core 40. Engagement of the retention surface 211 with the shell 66 and of the abutment face 216 with the stator core 40 at least in part restricts axial shifting of the stator core 40 and, more broadly, the stator 20 relative to the shell 66.

Although an interference fit for the outer annulus 202 as described above is preferred, it is also noted that other means of securing the ring portion 192 relative to the shell 66 (and, in turn, restricting relative axial shifting of the stator 20) are permissible according to some aspects of the present invention. For instance, the ring portion and shell might include complementary latch components, the ring portion might be fixed to the shell with fasteners (e.g., bolts or screws), etc.

Wire Management

As noted previously, the stator retention apparatus 190 preferably includes wire management structure 196. Furthermore, as also noted above, the stator 20 preferably includes wiring 52 forming a plurality of coils 51 and connector portions (not shown) between the coils 51.

The wire management structure 196 preferably includes inner and outer pluralities of axially extending legs 222 and 224, respectively. The legs 222 and 224 are preferably integrally formed with the ring portion 192, although other fixation means (including but not limited to adhesives, latches, and/or discrete fasteners such as bolts or screws) may also or alternatively be used.

In a preferred embodiment, the outer legs 224 each preferably includes a radially extending shelf 226 and an axially extending longitudinal portion 228. The longitudinal portions 228 are preferably generally rectangularly prismatic in form to each present radially inner and outer faces 228a and 228b, respectively, in addition to a pair of arcuately spaced apart side faces 228c and 228d. The flared radially innermost portions 58 of the insulative endcaps 56 are preferably disposed radially inside (and most preferably abut or nearly abut so as to be disposed immediately adjacent) the adjacent longitudinal portion 228 and rests on or is disposed adjacent the shelf 226. More particularly, the flared portions 58 each preferably present radially inner and outer faces 58a and 58b, respectively, with the outer faces 58b most preferably abutting or nearly abutting (i.e., being disposed immediately adjacent) corresponding inner faces 228a of the longitudinal portions 228.

The coils 51 also preferably abut or nearly abut the side faces 228c and 228d of the longitudinal portions 228. That is, each longitudinal portion 228 preferably extends between a pair of adjacent coils 51, most preferably radially inwardly from any connecting portions 52a of the wiring 52. The outer legs 224 therefore preferably function primarily to restrict connecting portions 52a of the wiring 52 from shifting radially inwardly into interference with the rotor 18. In a preferred embodiment, the outer legs 224 also cooperatively aid in restricting shifting of the stator 20 axially, radially, and arcuately (i.e., circumferentially) relative to the stator retention apparatus 190 due to the engagement with the endcaps 56, as noted above. Thus, the wire management structure 196 and the orientation features 194 both include the outer legs 224.

Preferably, four (4) inner legs 222 are provided in a radially offset, arcuately alternating relationship with the three (3) wells 304 for the magnetic sensors 290. More particularly, the inner legs 222 are disposed radially inside the wells 304 and with a pair of legs 222 flanking each well 304. Each of the inner legs 222 extends at least in part circumferentially between and radially inwardly of a pair of adjacent endcaps 56 (and, particularly, the flared portions 58 thereof), as well as additionally being disposed circumferentially between a pair of adjacent crowns 50 (or, more particularly, adjacent tips 50b thereof).

In greater detail still, the inner legs 222 are preferably generally rectangularly prismatic in form to each present radially inner and outer faces 222a and 222b, respectively, in addition to a pair of arcuately spaced apart side faces 222c and 222d. The side faces 222c and 222d preferably abut the tips 50b of the crowns 50 of a pair of adjacent teeth 47 and, more particularly, the side faces 47a thereof at the tips 50b. The outer faces 222b also preferably abut the inner faces 58a of the flared portions 58 of the endcaps 56. The inner legs 222 therefore also cooperatively aid in restricting shifting of the stator 20 axially, radially, and arcuately (i.e., circumferentially) relative to the stator retention apparatus 190. The inner legs 222 may also act to restrict slippage of connecting portions 52a of the wiring 52. Thus, the wire management structure 196 and the orientation features 194 both include the inner legs 222. The role of the inner legs 222 in ensuring appropriate initial positioning between the stator 20 and the stator retention apparatus 190 (e.g., during assembly of the gearmotor 10) will be discussed in greater detail below.

It is noted that it is possible in some embodiments of the present invention for small spacing to be provided between the inner legs and the adjacent crowns 50. That is, while direct abutment is preferred, positioning immediately adjacent one another so as to nearly abut falls within the scope of some aspects of the present invention.

Furthermore, the struts 206 extending between the inner and outer annuli 202 and 204 preferably restrict slippage of the connector portions in the aft direction while also providing electrical insulation relative to the dust cover 68. The struts 206 therefore also constitute wire management structure 196.

Provision of a stator retention apparatus 190 with such integrated structural wire management means enables simplified winding, with zip ties and other time-consuming securement methods becoming unnecessary (albeit still permissible according to some aspects of the present invention).

Sensor Mounting—Rotation Sensors

As noted previously, the stator retention apparatus 190 preferably includes first and second electronics mounting structures 198 and 200. The first electronics mounting structure 198 preferably comprises an axially projecting, generally horizontally extending mounting platform 230. More particularly, the mounting platform 230 preferably extends across the ring portion 192 from one location on the outer annulus 202 to another like a chord of a circle, and in the illustrated embodiment, also intersects the inner annulus 204 so as to receive the inner annulus 204 in slots 232 and 324 formed therein. The outer annulus 202 of the ring portion 192 of the stator retention apparatus 190 thus preferably circumscribes the platform 230.

The gearmotor 10 preferably includes an electronics assembly 236 including a rotor shaft rotation sensor 238 and an output shaft rotation sensor 240. The rotor 18 includes a rotor shaft position indicium 242 fixed relative to the rotor shaft 26, and the gear assembly 14 includes an output shaft position indicium 244 fixed relative to the output shaft 72. The rotor shaft rotation sensor 238 is configured to sense the rotor shaft position indicium 242, and the output shaft rotation sensor 240 is configured to sense the output shaft position indicium 244.

As noted previously, the rotor shaft 26 preferably circumscribes the output shaft 72. Furthermore, the output shaft 72 preferably extends axially past the aft end 36 of the rotor shaft 26 such that an exposed portion 246 of the output shaft 72 is uncovered (i.e., is not circumscribed by the rotor shaft 26.) Alternatively stated, the respective aft ends 36 and 166 of the rotor shaft 26 and output shaft 72 are axially offset from one another, with the aft end 166 of the output shaft 72 extending axially past the aft end 36 of the rotor shaft 26 in the aft direction so as to be the aftmost of the ends 36 and 166. Still further, the shafts 26 and 72 can be described in a sense as being "telescoping" shafts, with the output shaft 72 extending past the rotor shaft 26.

The output shaft position indicium 244 is preferably fixed to this exposed portion 246, adjacent the aft end 166 of the output shaft 72. Similarly, the rotor shaft position indicium 242 is preferably fixed to the rotor shaft 26 adjacent the aft end 36 of the rotor shaft 26. The rotor shaft rotation sensor 238 and the output shaft rotation sensor 240 are both preferably mounted to the mounting platform 230 so as to be radially spaced from and at least in part axially aligned with respective ones of the rotor shaft position indicium 242 and the output shaft position indicium 244. In a preferred embodiment, as illustrated, the sensors 238 and 240 are spaced radially outwardly from the corresponding position indicium. However, it is permissible according to some aspects of the present invention for either or both of the sensors to be spaced radially inwardly from the corresponding position indicium.

Furthermore, although it is permissible according to some aspects of the present invention for only a small portion of each indicium 242 or 244 to axially overlap the corresponding sensor 238 or 240, it is most preferable for substantial overlap to occur. For instance, it is preferred that at least twenty-five percent (25%) of each indicium 242 and 244 axially overlap the corresponding sensor 238 or 240, more preferred that at least fifty percent (50%) of each indicium 242 and 244 axially overlap the corresponding sensor 238 or 240, and most preferred that at least seventy-five percent (75%) of each indicium 242 and 244 axially overlap the corresponding sensor 238 or 240.

The sensors 238 and 240 are preferably mounted to the stator retention apparatus 190. More particularly, a first mounting plate or, in a preferred embodiment, a first printed circuit board 248 preferably overlies and rests on the platform 230. In greater detail still, a pair of spaced apart slits 250 are defined through the first circuit board at a fore edge 252 thereof. The platform 230 in part defines a pair of positioning tabs 254 that slot into corresponding ones of the slits 250. Furthermore, the platform 230 defines a pair of fastener-receiving holes 256. The first printed circuit board 248 also defines a pair of fastener-receiving holes 258. Corresponding ones of the holes 256 and 258 preferably align with one another after assembly, with corresponding fasteners (not shown) extending therethrough to secure the first printed circuit board 248 to the platform 230. Alternate means of fixing the first printed circuit board to the platform, including but not limited to adhesives, latches, and alternative interengaging structures and discrete fasteners, also fall within the scope of some aspects of the present invention.

The sensors 238 and 240 are preferably each encoder chips, although other sensor types fall within the scope of the present invention. The first printed circuit board 248 preferably includes a top face 260 and a bottom face 262. The sensors 238 and 240 are preferably mounted to the bottom face 262 (e.g., via adhesives or other means known to those of ordinary skill in the art) and extend through an elongated slot or aperture 264 defined in the platform 230 such that only an air gap 266 exists between the sensors 238 and 240 and the corresponding indicia 242 and 244. Other fixation arrangements fall within the scope of the present invention, however. For instance, the platform might define a slot for each of the sensors, or the first printed circuit board could be cantilevered or supported only on two (2) or three (3) sides by the platform rather than being substantially congruent with the platform, as in the preferred, illustrated embodiment.

Each indicium 242 and 244 preferably comprises a radially projecting decal 268 or 270, respectively, secured to the corresponding shaft 26 or 72. The decals 268 and 270 preferably extend circumferentially about a portion of an outer face of each of the corresponding shafts 26 and 72. More particularly, the decals 268 and 270 each preferably extend circumferentially around less than one eighth (⅛) of the circumference of each corresponding shaft 26 or 72. Greater or lesser circumscription extent (e.g., only one sixteenth (1/16) of the corresponding circumference, the entire circumference, or a different proportion of the circumference for each shaft/decal combination) fall within the scope of the present invention, although detrimental effects on data quality are most preferably avoided. Furthermore, either or both indicia may be in a form other than a decal. For instance, either or both indicia might instead be in the form of etching, printing, etc.

The electronics assembly 236 as illustrated also includes a connector box 272. However, any of a variety of additional electronics may be provided without departing from the scope of the present invention.

The previously mentioned rotation sensors 238 and 240 are configured to sense or "read" the corresponding indicium 242 or 244 to provide data for determining the angular position, speed, and/or direction of each of the rotor shaft 26 and the output shaft 72. Both absolute and relative (e.g., one shaft relative to the other) position, speed, and/or direction may be determined in this manner.

It is noted that the provision of two (2) rotation sensors 238 and 240, mounted on a single printed circuit board 248 in order to read data radially directly from the corresponding shafts 26 and 72, contrasts significantly from conventional arrangements requiring radially spaced apart rotation sensors, each mounted to its own separate printed circuit board and reading respective output shaft and rotor shaft data provided on multiple discrete, radially extending codewheels. That is, the present invention drastically reduces the complexity and number of parts associated with prior art designs.

Even further, the radially oriented "reading" direction of the present invention and the corresponding axially aligned disposition of the rotation sensors 238 and 240 further facilitates a preferred overall smaller gearmotor outer diameter than would be achieved in a conventional design Sensor Mounting—Magnetic Sensors The second electronics mounting structure 200 preferably comprises a generally vertically (i.e., radially) extending mounting platform or wall 274 extending from the aforementioned axially projecting platform 230 to the outer annulus 202. The platform 230 and the wall 274 are preferably oriented orthogonally to one another, although alternative relative positioning falls within the scope of some aspects of the present invention.

Most preferably, the wall 274 extends from the platform 230 to a juncture 276 between the fore and aft portions 208 and 210 of the outer annulus 202. In a preferred embodiment, the wall 274 in part defines the aforementioned positioning tabs 254, such that the tabs 254 extend between and interconnect the platform 230 and the wall 274. However, other interconnection means (e.g., adhesives, latches, discrete fasteners, etc.) might additionally or alternatively be used. Interconnection may also simply be omitted.

Figure 8:
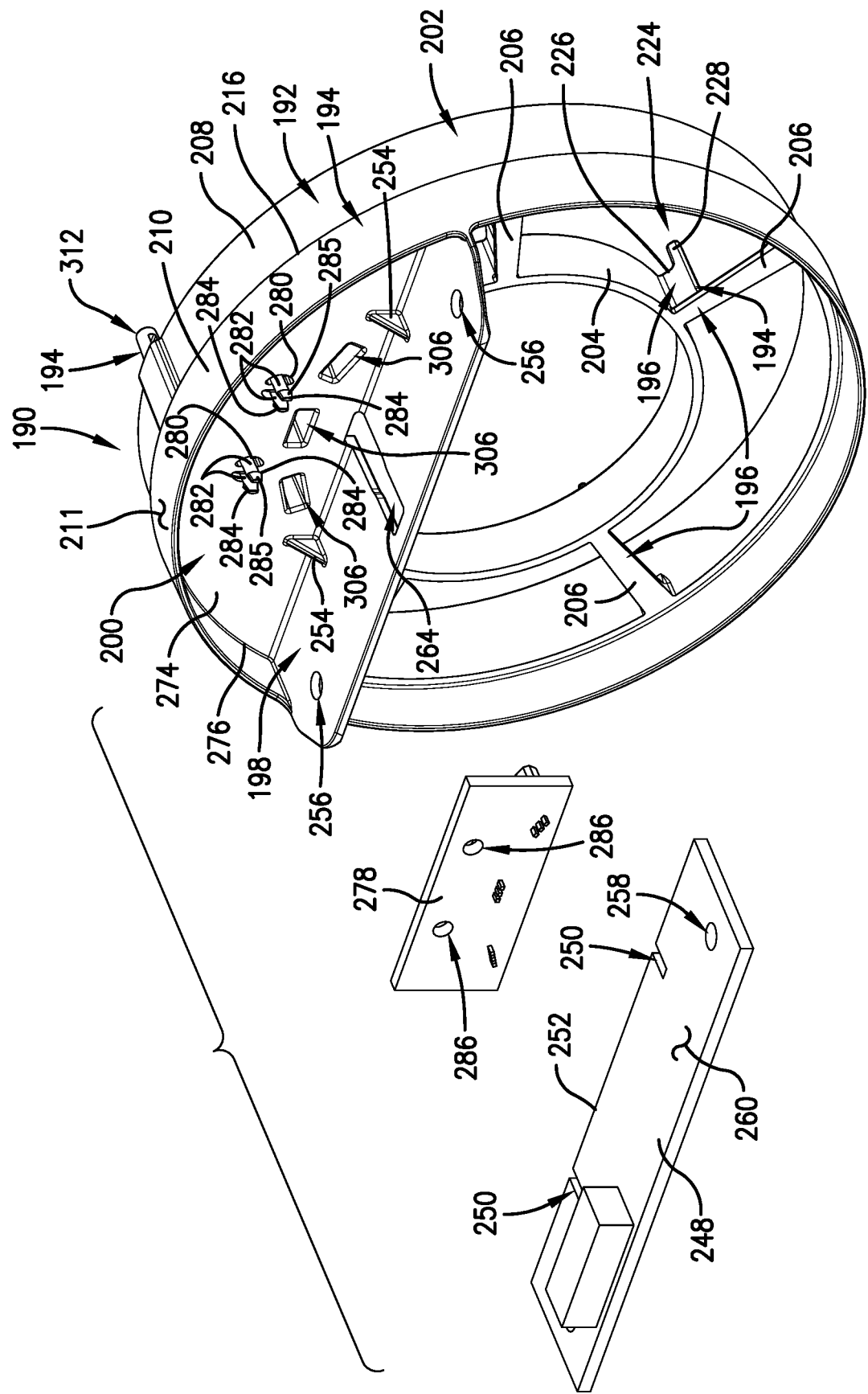
FIG. 8 is an exploded perspective view of the stator retention apparatus and electronics assemblies of FIG. 7.
Figure 9:
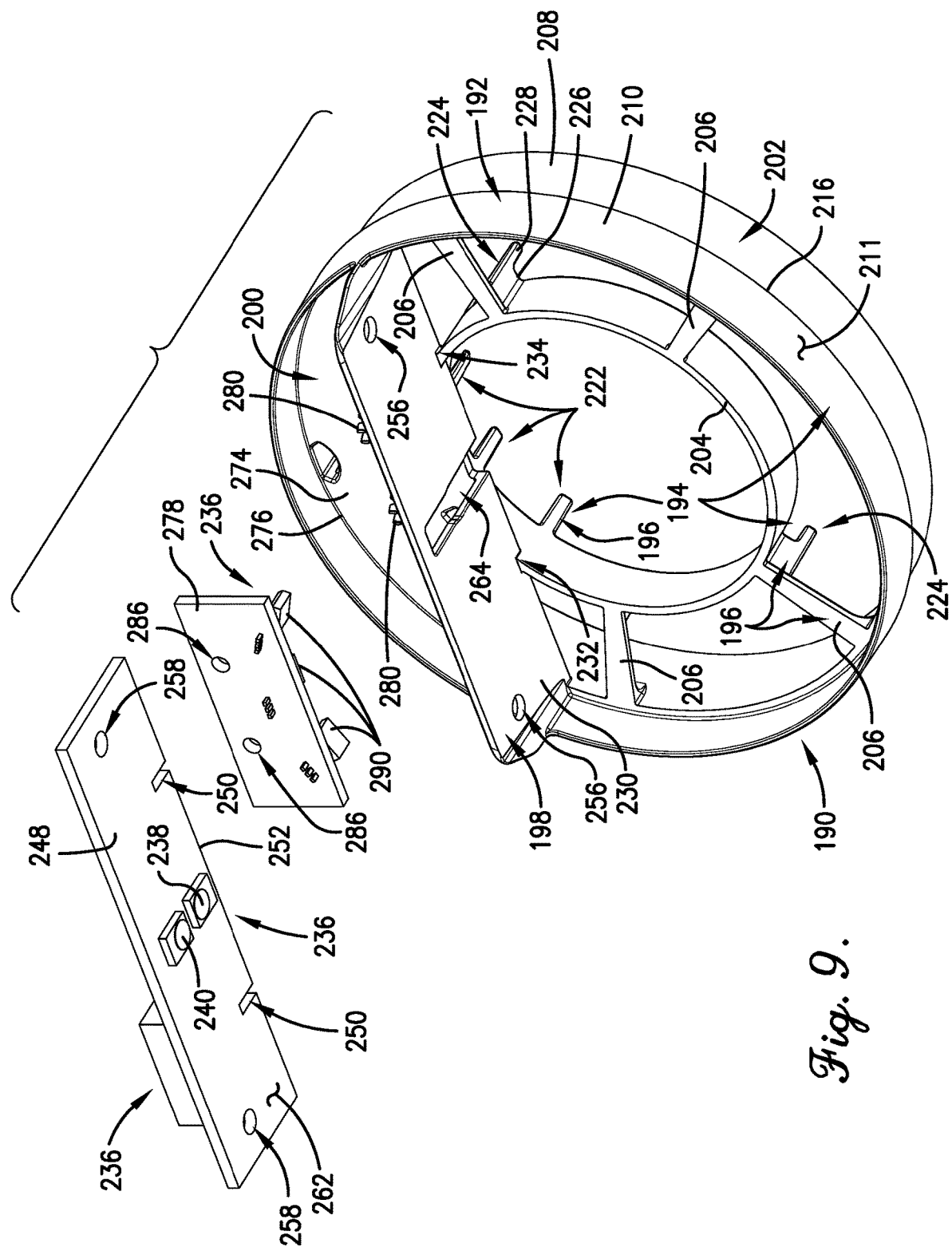
FIG. 9 is an alternative exploded perspective view of the stator retention apparatus and electronics assemblies of FIGS. 7 and 8.

A second mounting plate or, in a preferred embodiment, a second printed circuit board 278, preferably overlies and is fixed to the wall 274. More particularly, the wall 274 preferably includes a pair of tubular latch projections 280, of which each includes a pair of latch necks 282 and a pair of latch heads 284 extending from the necks 282 (see FIG. 8). The latch heads 284 each include a cam surface 285 (see FIG. 8). The second printed circuit board 278, in turn, includes a corresponding pair of latch-receiving holes 286. Placement of the second printed circuit board 278 is such that the latch projections 280 extend through the holes 286 to secure the board 278 to the wall 274. More particularly, the latch necks 282 are preferably substantially elastically deformable (i.e., resiliently deformable). Compression of the latch necks 282 and heads 284 of each latch projection 280 toward one another facilitates insertion of the otherwise too-large heads 284 into the corresponding holes 286. Upon clearing the holes 286, the heads 284 expand away from each other (i.e., return to their original state) so as to again be oversized relative to the holes 286 and thereby enhance the security of the mounting. Compression of the necks 282 and heads 284 is initially driven by engagement of the cam surfaces 285 against the second printed circuit board 278, although other mechanisms might alternately be used. In a broad sense, however, it is preferred that the second printed circuit board 278 be removably secured to the second electronics assembly mounting structure 200, with such securement most preferably being by means of latches 288 (comprising the projections 280 and holes 286) that are cooperatively formed by the wall 274 and the second printed circuit board 278. Furthermore, although it is preferred that the latch projections are formed by the wall, a reversed latch arrangement or a combination of arrangements are permissible.

As noted previously, the electronics assembly 236 preferably includes the rotor shaft rotation sensor 238 and the output shaft rotation sensor 240, each of which is mounted to the platform 230 of the first electronics mounting structure 198. The electronics assembly 236 also preferably includes a plurality of magnetic sensors 290 mounted to the second electronics mounting structure 200. Three (3) magnetic sensors 290 are provided in the illustrated preferred embodiment, but aspects of the present invention apply to embodiments simply having at least one (1) magnetic sensor.

The magnetic sensors 290 are preferably Hall effect sensors, although other sensors fall within the scope of the present invention. That is, some aspects of the present invention are not limited to magnetic sensors.

As discussed above, the stator 20 includes a plurality of coils 51 wound about the stator core 40. The coils 51 cooperatively present fore and aft axial coil margins 292 and 294, respectively. As will be described in greater detail below, each of the magnetic sensors 290 is preferably positioned axially adjacent or only slightly spaced from the corresponding aft coil margin 294.

Furthermore, the magnetic sensors 290 are preferably each disposed adjacent a radially inner margin 298 collectively defined by the coils 51. Alternatively described, the magnetic sensors 290 are disposed just radially outside a circumferential gap 300 defined between the rotor 18 and the stator 20, so as to be spaced a small distance radially outward of the rotor magnets 24. Positioning of the sensors further radially outward from the inner margin is permissible according to some aspects of the present invention, however.

Figure 5:
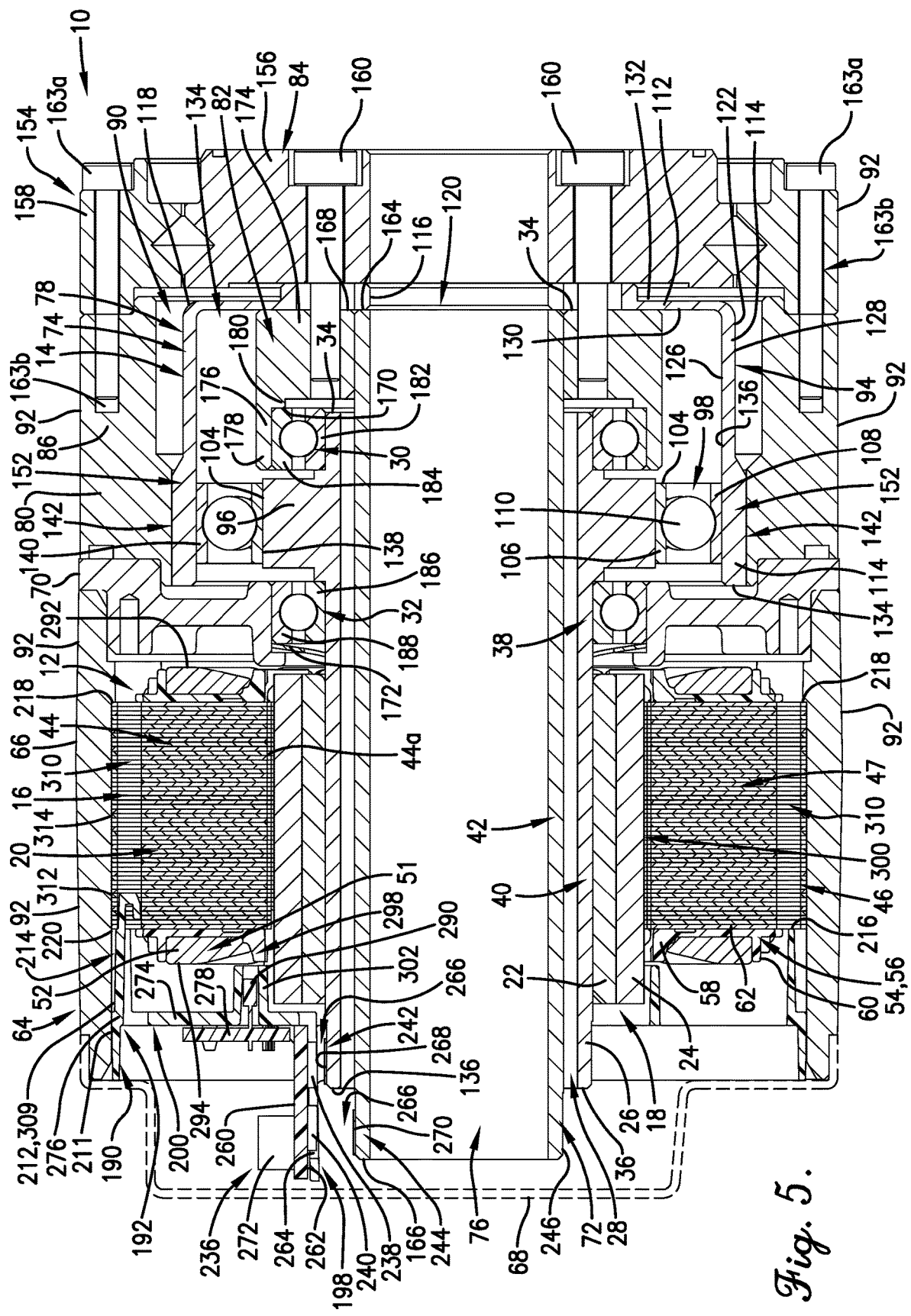
FIG. 5 is a cross-sectional side view of the gearmotor of FIGS. 1-4, taken along line 5-5 of FIG. 4.
Figure 5A:
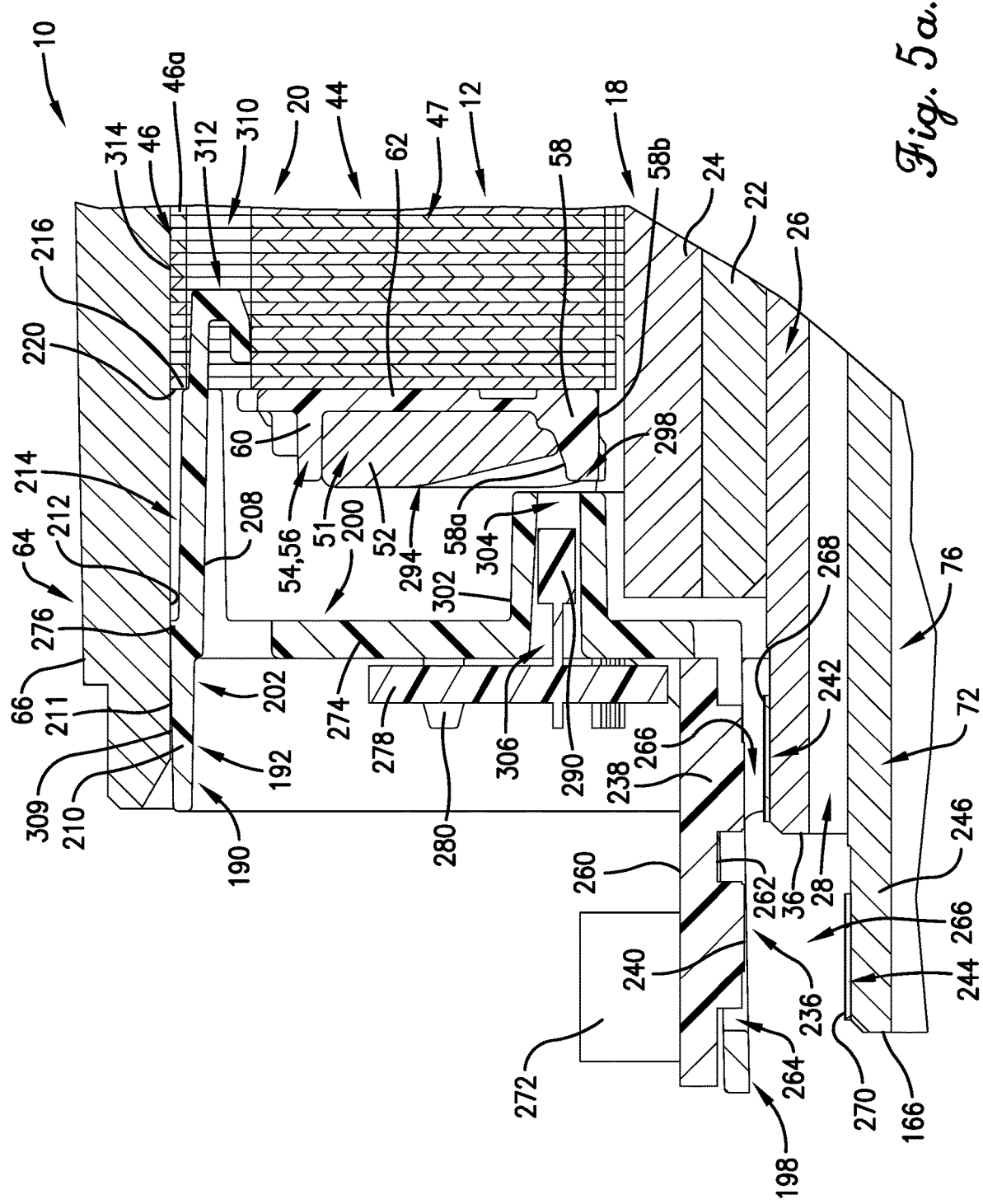
FIG. 5a is an enlarged cross-sectional side view of a portion of the gearmotor of FIG. 5, particularly illustrating the positioning of magnetic and rotor sensors and the functionality of the orientation peg.

Each of the magnetic sensors 290 is preferably mounted to the second printed circuit board 278. More particularly, as best shown in FIG. 5a, the second electronics mounting structure 200 preferably includes a plurality of axially projecting sleeves 302 each defining a sensor well 304 corresponding to one of the magnetic sensors 290. Openings 306 in the wall 274 connect with corresponding ones of the wells 304. Each of the magnetic sensors 290 is preferably fixed to the second printed circuit board 278 by any means known in the art. Upon fixation of the second printed circuit board 278 to the wall 274 via the latching mechanism 288 described above, the magnetic sensors 290 pass through corresponding ones of the openings 306 to each be received in a corresponding one of the wells 304. The axial, radial, and arcuate (or circumferential) position of the magnetic sensors 290 relative to the stator retention apparatus 190 is thus at least substantially fixed.

Sensor Positioning

As will be understood by those of ordinary skill in the art, accurate positioning of the rotation sensors 238 and 240 relative to the indicia 242 and 244 is critical to their functionality determining angular position of the shafts 26 and 72. Likewise, accurate positioning of the magnetic sensors 290 relative to the rotor 18 and the stator 20 (e.g., as influenced by the slot:pole ratio of the motor) is essential to accurate magnetic field readings. As will be discussed in detail below, the stator retention apparatus 190 is configured to enable efficient and accurate positioning of the sensors 238, 240, and 290.

More particularly, in a preferred embodiment, as illustrated, the stator 20 defines a plurality of stator orientation features 308. The housing 88 defines a housing orientation feature 309. The stator retention apparatus 190 includes the aforementioned apparatus orientation features 194. The apparatus orientation features 194 engage respective ones of the stator orientation features 308 and the housing orientation feature 309 to position the stator retention apparatus 190 radially and arcuately (i.e., circumferentially) relative to the stator 20 (and, most particularly, the core 40 thereof) while also aiding in axial positioning. That is, the stator retention apparatus 190 is preferably "self-clocking." Such engagement appropriately positions the sensors 238, 240, and 290 in the most preferred positions described in detail above, due to their mounting on the stator retention apparatus 190 (as also described in detail above).

The apparatus orientation features 194 preferably comprise (1) the aforementioned inner legs 222 and, most particularly, the side faces 222c and 222d thereof; (2) the outer retention surface 211 of the ring portion 192 of the stator retention apparatus 190; (3) a retention peg 312 to be described in greater detail below; and (4) the aforementioned outer legs 224, and in particular the inner and side faces 228a, 228c, and 228d thereof. As will be discussed in greater detail below, the inner legs 222 preferably act as the primary drivers of rotational orientation of the stator retention apparatus 190 and, in turn, positioning of the magnetic sensors 290. The outer retention surface 211 of the ring portion 192 preferably acts as the primary driver of concentricity of the shell 66, the stator 20, and the stator retention apparatus 190. The retention peg 312 preferably acts primarily to provide secondary or redundant mechanical retention and positioning to supplement that of the inner legs 222. The outer legs 228 preferably act primarily in a wire management functionality while also providing secondary or redundant mechanical retention and positioning to supplement that of the inner legs 222.

The stator orientation features 308 preferably comprise (1) the aforementioned tooth side faces 47a at the tips 50b; (2) a plurality of arcuately spaced apart apertures 310 extending through the stator core 40, each preferably extending through a yoke segment 46a thereof to correspond to and be centered arcuately (or circumferentially) with respect to a stator tooth 47; and (3) the coils 51 and the aforementioned outer faces 58b of the flared portions 58 of the end caps 56.

The housing orientation feature 309 preferably comprises (1) the inner surface 212 of the shell 66.

In a preferred embodiment, the apertures 310 are preferably cylindrical in form and disposed adjacent (i.e., only slightly radially inwardly from) an outer face 314 of the stator core 40. However, the apertures might be alternatively positioned within the stator core, including but not limited to immediately along the outer face so as to be in the form of longitudinally extending notches. The apertures might also be offset arcuately from the radial midlines of the stator teeth if any necessary corresponding adjustments are made to the positioning of the apparatus orientation feature on the stator retention apparatus. For instance, the apertures might be arcuately shifted so as to be aligned with slots defined between each of the teeth, with the apparatus orientation features being arcuately shifted a corresponding amount such that proper positioning of the magnetic sensors nevertheless occurs upon assembly.

The apertures 310 each preferably extend axially through the entirety of the stator core 40, although partial extension falls within the scope of the present invention.

The orientation peg 312 preferably extends axially from the fore portion 208 of the ring portion 192. The peg 312 is preferably received at least in part in one of the apertures 310 and is most preferably received therein in its entirety upon engagement of the abutment face 216 of the stator retention apparatus 190 against the aft end face 220 of the stator core 40. The stator core 40 is preferably rotationally symmetrical, such that selection of a specific aperture 310 to receive the peg 312 is unnecessary.

It is noted that in some embodiments of the present invention, fewer pegs 312 are provided than apertures 310. Furthermore, at least some and most preferably all of the apertures 310 in which the peg 312 is not received may be used for alternative purposes. For instance, in a preferred embodiment, fasteners (e.g., bolts or screws; not shown) preferably extend through the dust cover 68, the stator retention apparatus 190, and stator core 40 (via the apertures 190), to be received in the endshield 70. It is noted that corresponding openings (not shown) in the dust cover 68 and the stator retention apparatus 190 would be necessary to facilitate such fasteners.

Figure 5B:
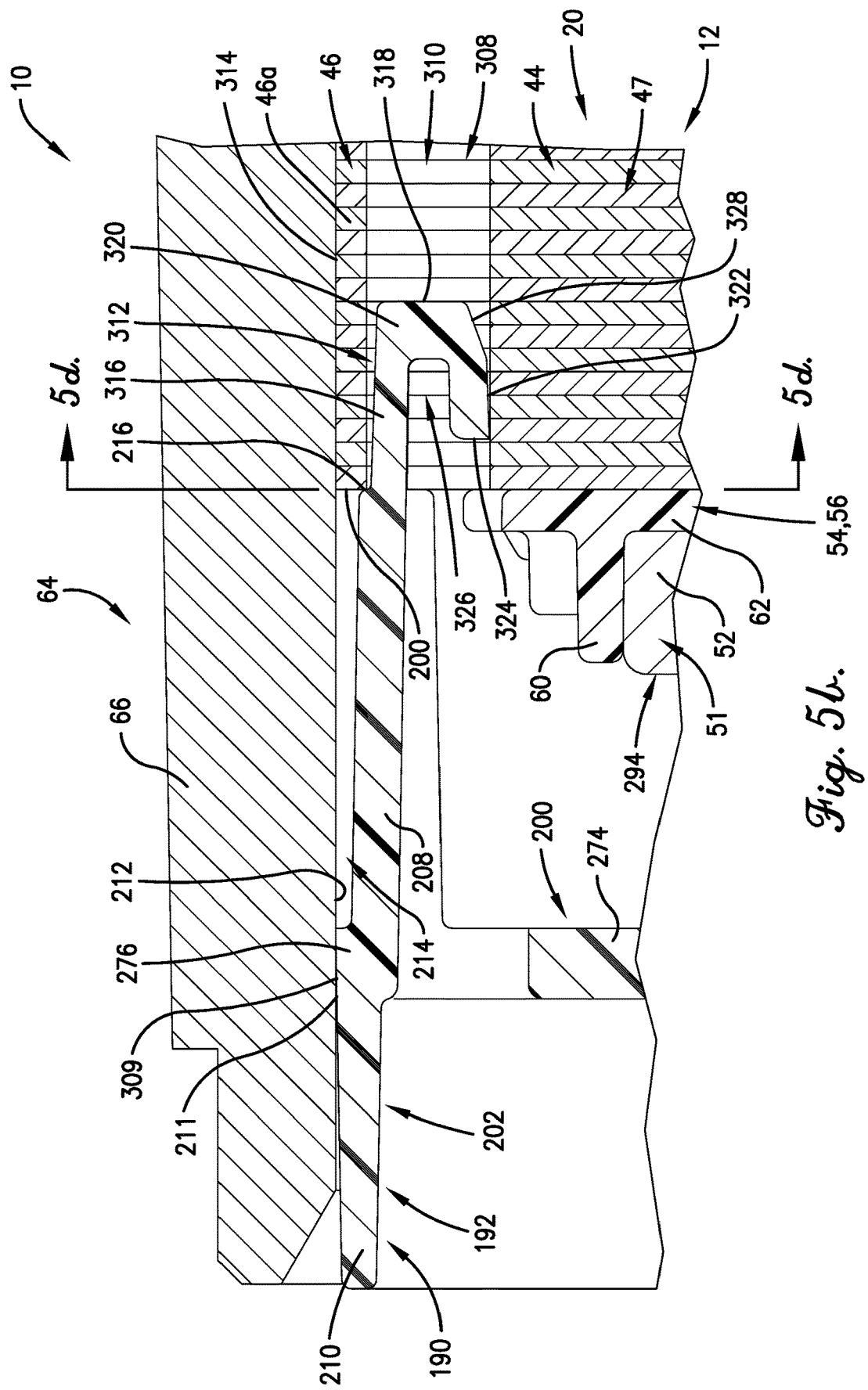
FIG. 5b is an enlarged cross-sectional side view of a portion of the gearmotor of FIG. 5b, further illustrating the functionality of the orientation peg.
Figure 5D:
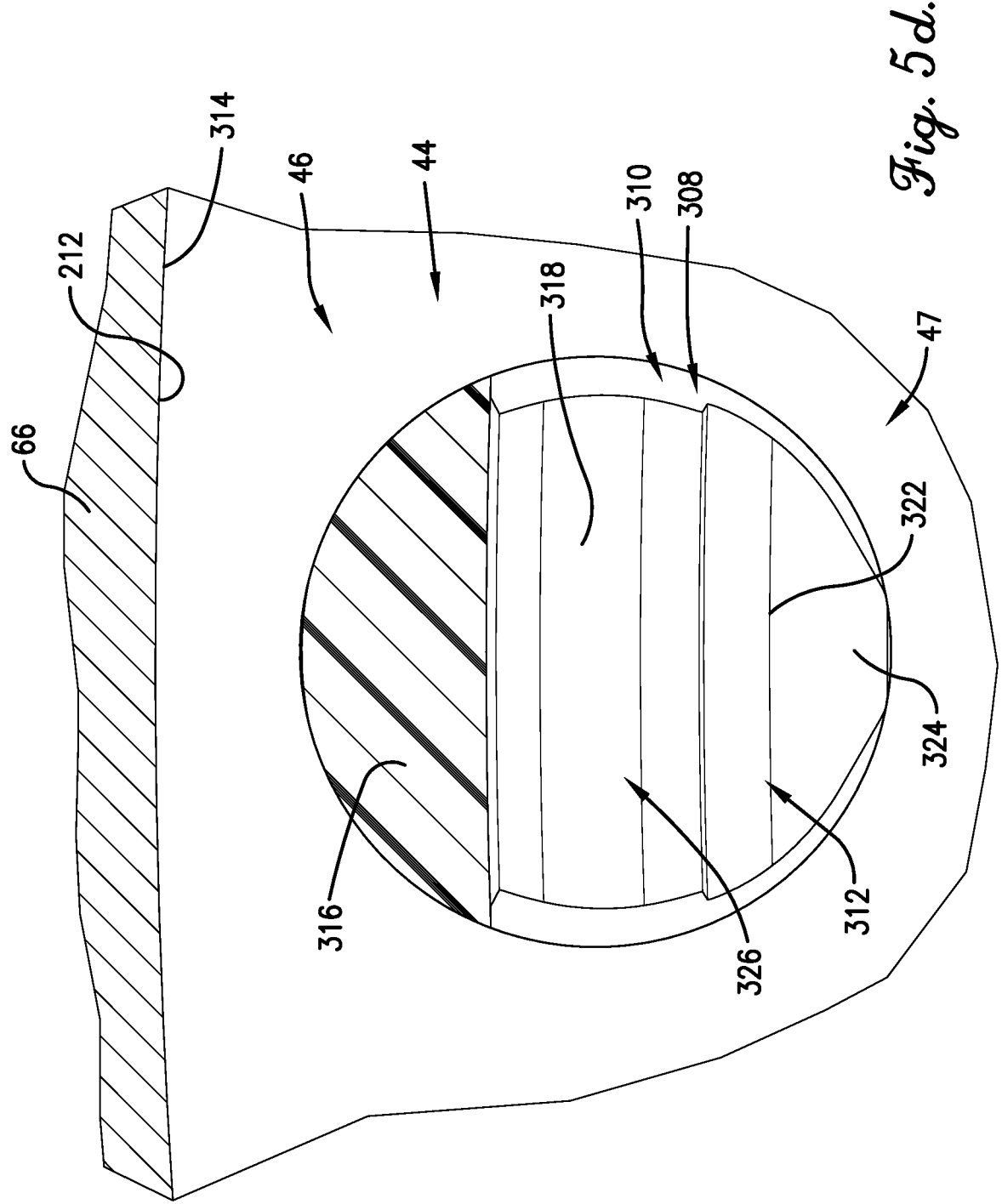
FIG. 5d is a rear view cross-sectional view of the orientation peg and corresponding aperture, taken alone line 5d-5d in FIG. 5b.
Figure 10:
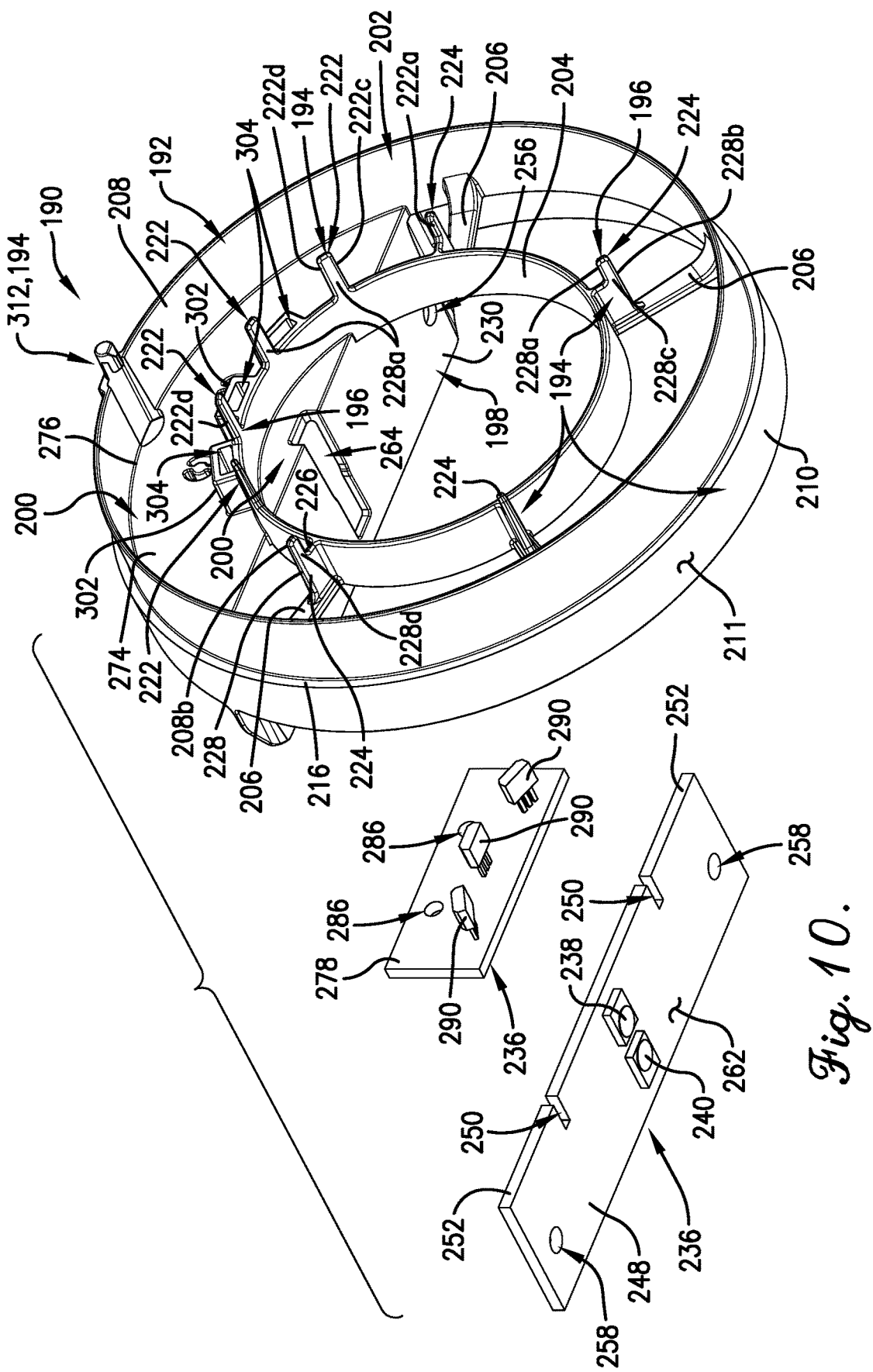
FIG. 10 is an exploded front perspective view of the stator retention apparatus and electronics assemblies of FIGS. 7-9.
Figure 13:
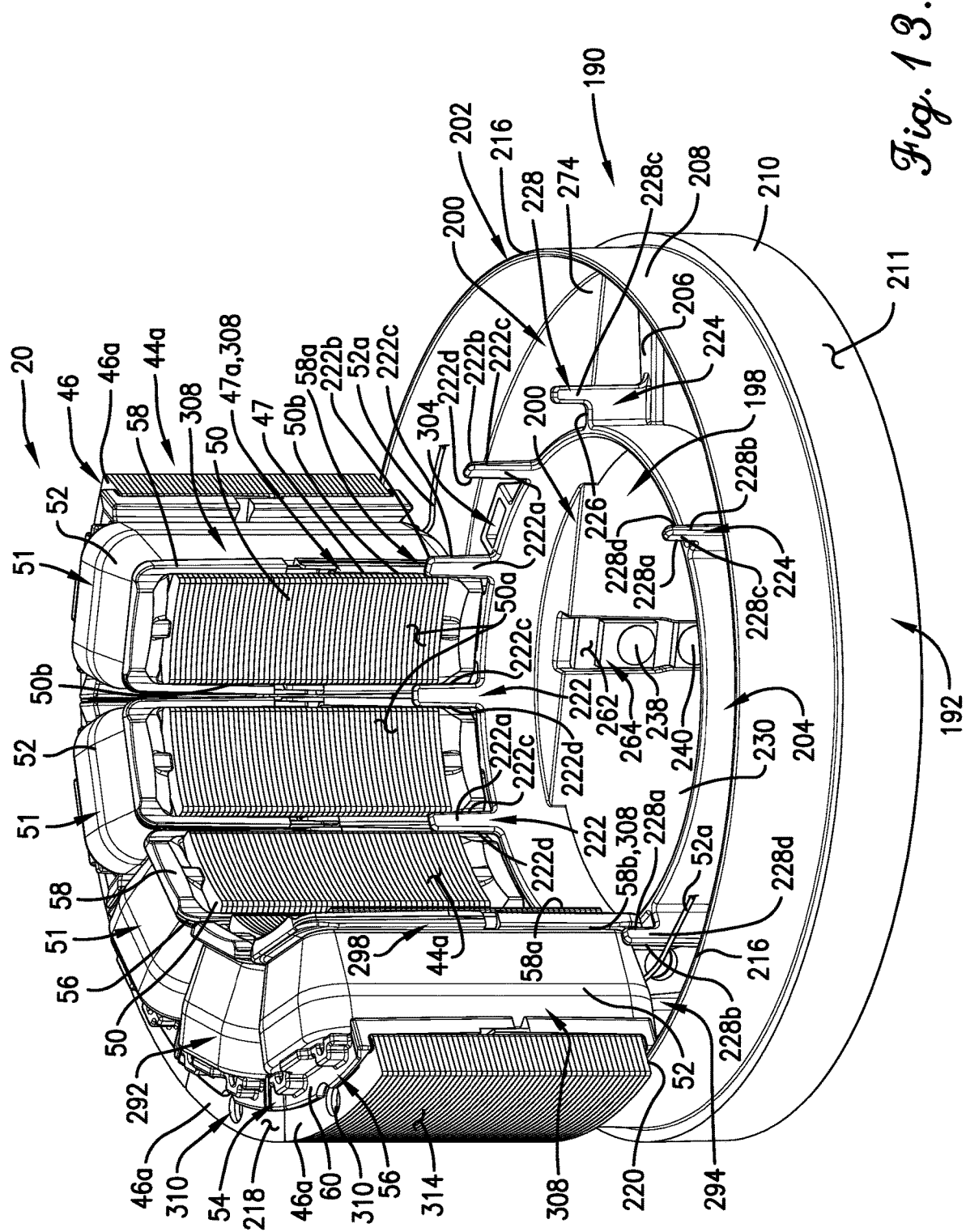
FIG. 13 is a perspective view of the stator retention apparatus and electronics assemblies in relation to a portion of the stator of the motor assembly of FIGS. 1-5.
Figure 14:
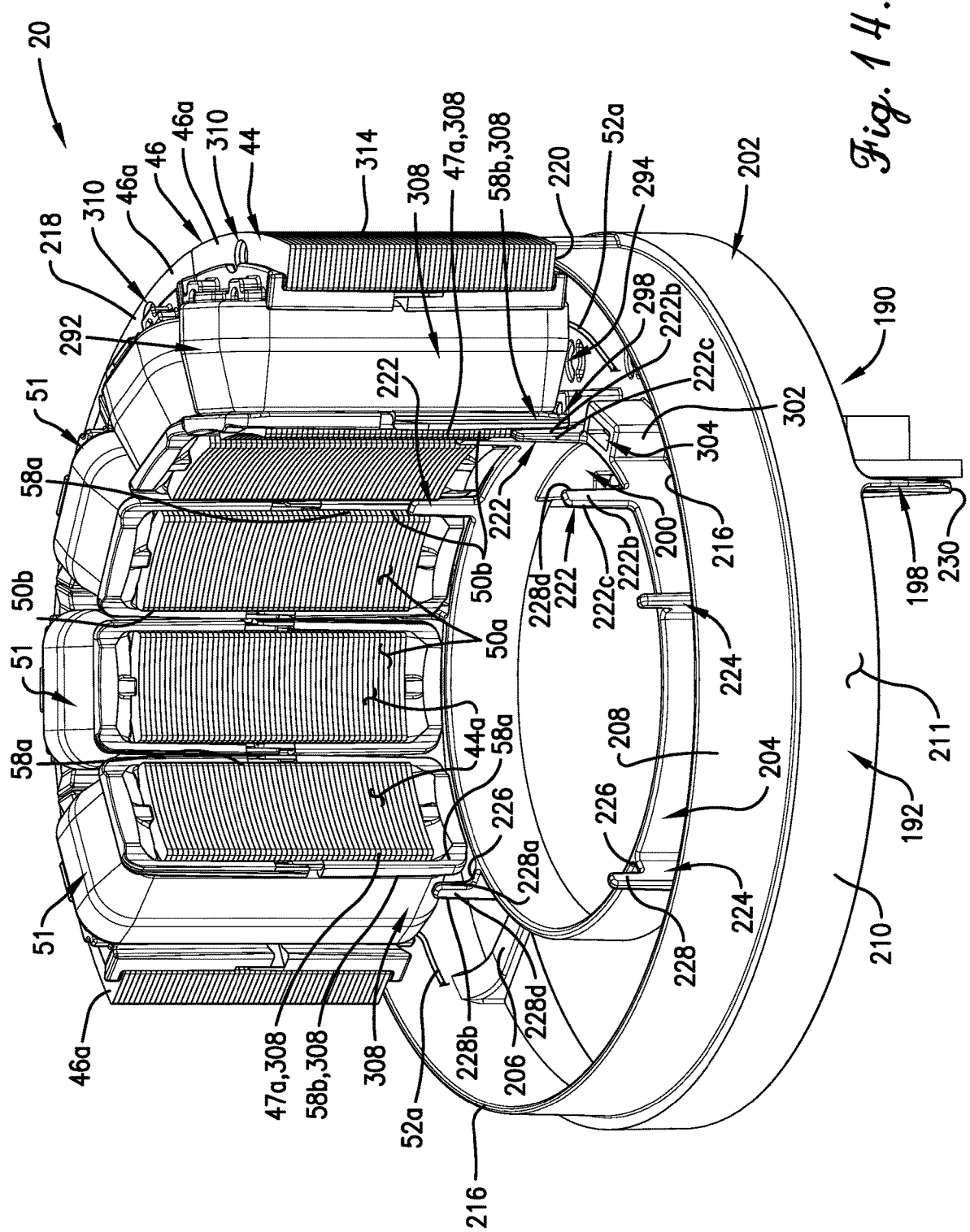
FIG. 14 is an alternate perspective view, similar to FIG. 13, of the stator retention apparatus and electronics assemblies in relation to a portion of the stator of the motor assembly of FIGS. 1-5.
Figure 15:
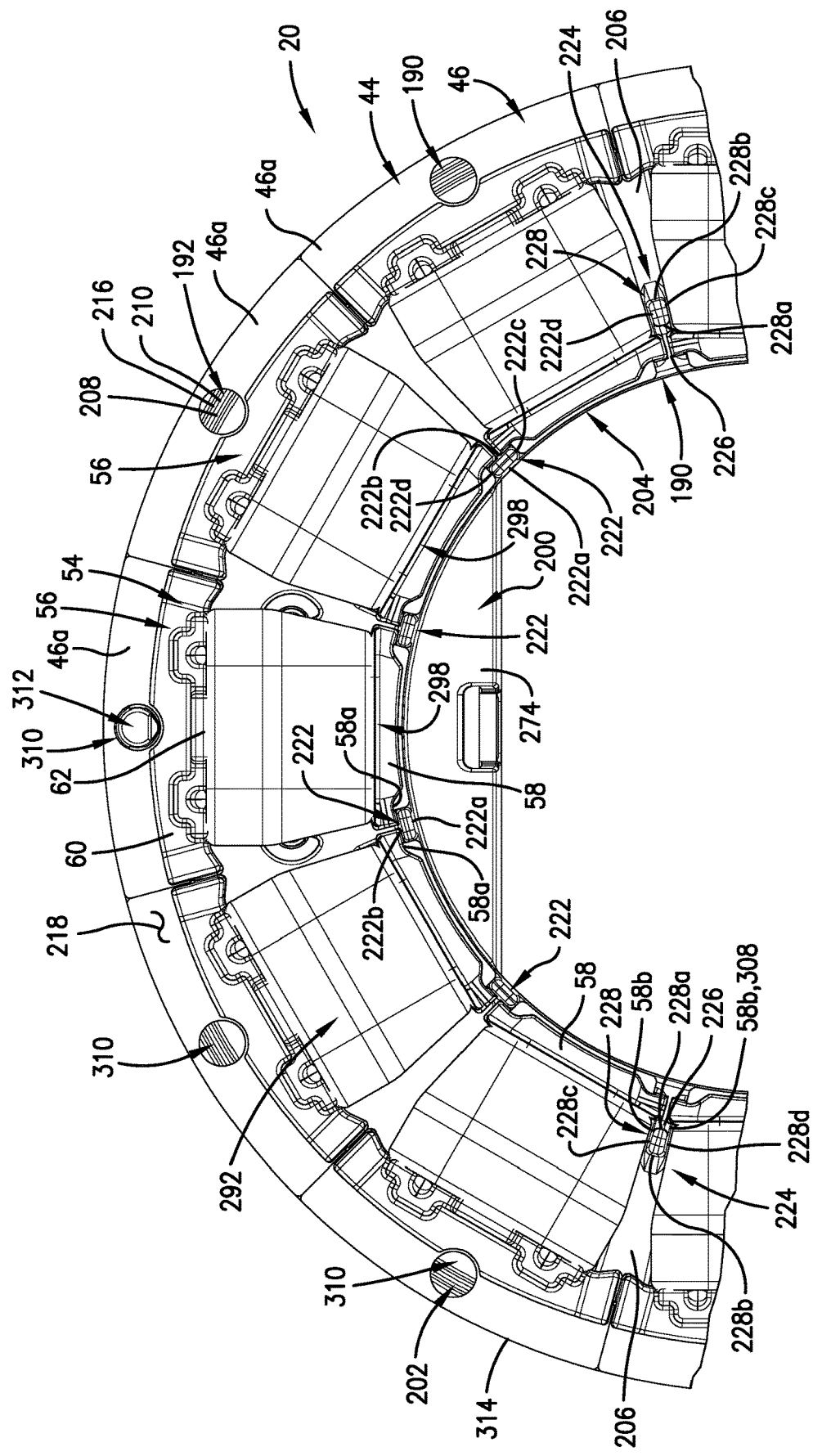
FIG. 15 is a front view of a portion of the stator retention apparatus and electronics assemblies in relation to a portion of the stator of the motor assembly of FIGS. 1-5.
Figure 16:
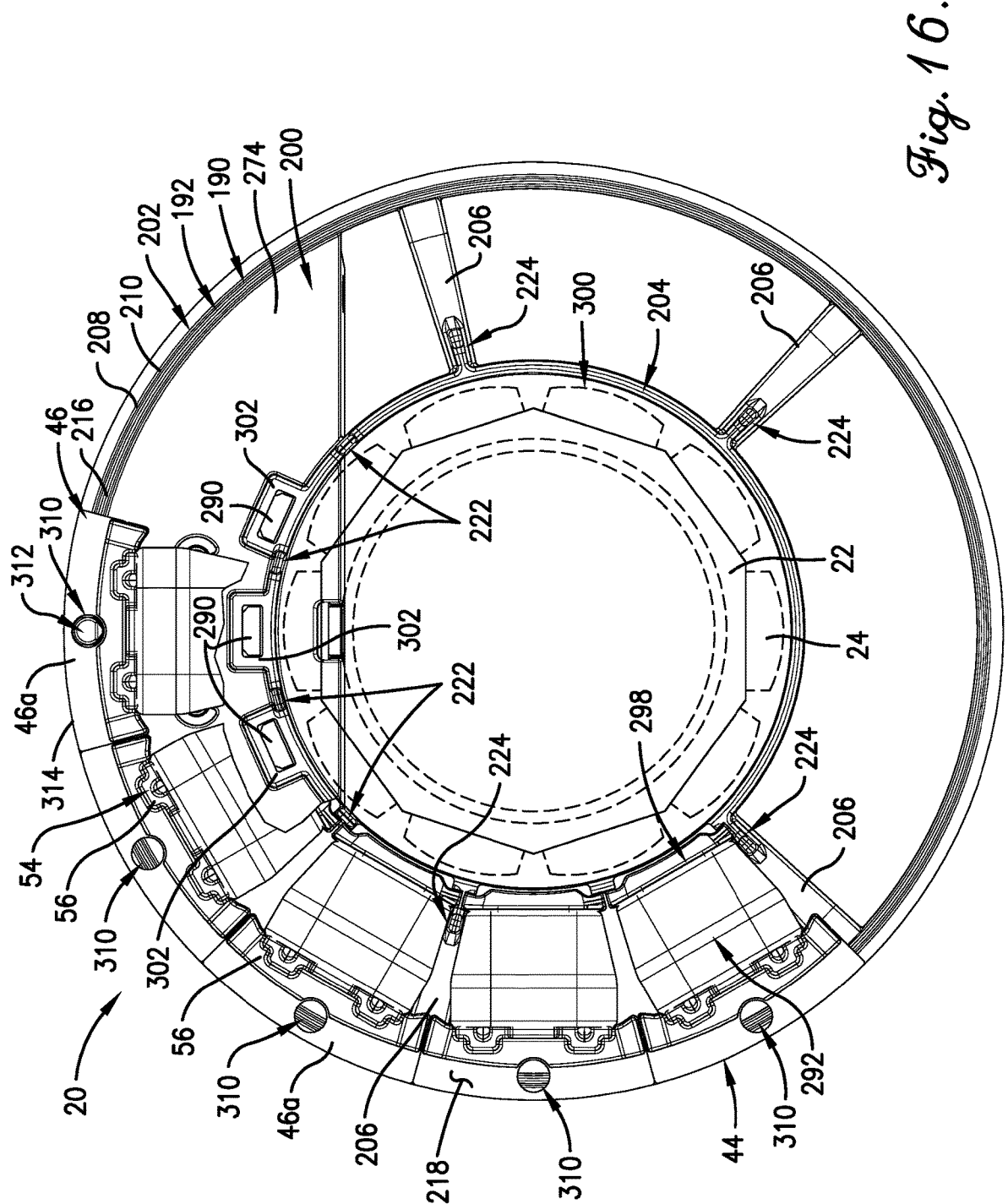
FIG. 16 is a front view of the stator retention apparatus and electronics assemblies in relation to portions of the rotor and stator of the motor assembly of FIGS. 1-5, with portions of the stator being further fragmented to particularly illustrate the relative positioning of the sensors.

In a preferred embodiment, the peg 312 exerts a spring force against the interior of the stator core 40 at the aperture 310. More particularly, as best shown in FIGS. 5b, 5c, and 10a, the peg 312 preferably includes a fixed portion 316 extending axially forward from the ring portion 192, a disc-like (i.e., circularly cross-sectioned) nose 318 disposed at a fore end 320 of the fixed portion 316, and a resiliently deflectable portion 322 extending generally axially from the nose 318 in an aft direction. The deflectable portion 322 defines an end 324 that is axially spaced away from the ring portion 192 in a fore direction. That is, the fixed portion 316 is preferably longer than the deflectable portion 322. An axially extending, radial gap 326 preferably is formed between the fixed portion 316 and the deflectable portion 322.

The fixed portion 316 and the deflectable portion 322, in its default undeflected state, preferably cooperatively define a flared margin of the peg 312, such that the peg 312 as a whole may be described as frustoconical. The margin is preferably slightly larger in its radial dimensions than each of the apertures 310, such that insertion of the peg 312 into a corresponding one of the apertures requires radial compression of the peg 312. In a preferred embodiment, this is achieved through radially outward bending of the deflectable portion 322. That is, the deflectable portion 322 bends toward the fixed portion 316, decreasing the size of the gap 326 therebetween and of the margin of the peg 312. This deflection is most preferably facilitated by a cam surface 328 (best shown in FIGS. 5b, 5c, and 10a) extending obliquely from the nose 318 to the deflectable portion 322. Engagement of the cam surface 328 with the stator core 40 at the relevant aperture 310 as the stator retention apparatus 190 moves in a fore direction preferably results in radial deflection of the deflectable portion 322 until the peg 312 fits within the aperture 310.

Once in the aperture 310, the deflectable portion 322 preferably attempts to return to its natural state, thereby applying a radially inward spring force against the interior of the stator core 40 at the aperture 310. The peg 312 thus provides resistance to axial shifting of the stator retention apparatus 190 relative to the stator core 40, in addition to the more readily apparent resistance to relative arcuate or circumferential shifting and radial shifting.

However, it is noted that, in some embodiments, the orientation peg may be sized to slip into the aperture easily, via a tight or interference fit, or via some other mechanism or fit. It is also noted that the illustrated generally cylindrical shape may be varied to correspond to alternatively shaped apertures. For instance, a square cross-sectioned peg might be provided to correspond to a square cross-sectioned aperture.

It is also noted that, in some embodiments, a general reversal or partial reversal of the above-described peg/apertures system might be implemented. For instance, one or more pegs or other projections might extend instead from the stator core and be received in a corresponding aperture or apertures formed in the stator retention apparatus. Still further, pegs or other projections might extend from both the stator retention apparatus and the stator core, with corresponding apertures in turn being formed in both the stator retention apparatus and the stator core.

In summary, upon assembly of a preferred embodiment of the gearmotor 10, (1) the outer retention surface 211 of the stator retention apparatus 190 engages the inner surface 212 of the shell 66 via a slight interference fit, thereby primarily driving concentricity of the stator 20 relative to the rotor 18; (2) the inner legs 222 extend axially between adjacent crowns 50 of a pair of adjacent teeth 47 such that side faces 222c and 222d of the inner legs 222 engage corresponding tooth side faces 47a at the tips 50b, thereby primarily driving rotational orientation of the stator retention apparatus 190 relative the stator 20; (3) the peg 312 is deflected to enable entry into one of the aperture s 310 and subsequent application of a spring force against the stator core 44, thereby primarily providing additional (i.e., secondary or redundant) mechanical retention of the stator retention apparatus 190; and (4) the outer legs 228 extend between pairs of adjacent coils 51 such that the inner faces 228a engage the outer faces 58b of the flared portions 58 of the end caps 56 and the side faces 228a and 228b engage or nearly engage adjacent ones of the coils 51, thereby primarily providing wire routing functionality.

It is noted that, although engagement of the outer retention surface 211 with the shell 66 during assembly preferably occurs prior to functional engagement of others of the apparatus orientation features 194, the inner legs 222, the outer legs 228, and the peg 312 may engage the stator 20 in any order or even simultaneously without departing from the scope of some aspects of the present invention. For instance, the inner legs might be lengthened and/or the peg might be shortened to ensure that the inner legs act first to rotationally position the stator retention apparatus.

In view of the above, it is clear that the stator retention apparatus 190 is variably arcuately or circumferentially securable relative to the stator core 40 upon alignment of only one of the axially projecting ones of the apparatus orientation features 194 (i.e., the inner legs 222, the outer legs 228, and the peg 312) with any one of the plurality of corresponding stator orientation features 308, with more stator orientation features 308 being provided than apparatus orientation features 194. That is, the stator retention apparatus 190 can efficiently and appropriately (i.e., correctly) be mounted in more than one arcuate or rotational (or circumferential) position while nevertheless providing appropriate positioning of the sensors 238, 240, and 290.

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently as part of separate embodiments in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention.

What is claimed is:

1. A gearmotor comprising:
a motor assembly including a rotor,
said rotor including—
a rotor shaft rotatable about an axis, and
a rotor shaft position indicium;
a gear assembly including—
an output shaft rotatable about the axis, and
an output shaft position indicium,
one of said rotor shaft and said output shaft circumscribing the other of said rotor shaft and said output shaft; and
an electronics assembly including a rotor shaft rotation sensor and an output shaft rotation sensor,
said rotor shaft rotation sensor being entirely radially spaced from said rotor shaft position indicium such that a radial rotor shaft sensor gap is formed therebetween,
said output shaft rotation sensor being entirely radially spaced from said output shaft position indicium such that a radial output shaft sensor gap is formed therebetween.

2. The gearmotor of claim 1,
said rotor shaft rotation sensor being spaced radially outwardly from said rotor shaft position indicium,
said output shaft rotation sensor being spaced radially outwardly from said output shaft position indicium.

3. The gearmotor of claim 1,
said rotor shaft rotation sensor being at least in part axially aligned with said rotor shaft position indicium,
said output shaft rotation sensor being at least in part axially aligned with said output shaft position indicium.

4. The gearmotor of claim 1,
said rotor shaft presenting a rotor shaft end,
said output shaft presenting an output shaft end,
said output shaft end being adjacent and axially offset from said rotor shaft end.

5. The gearmotor of claim 1,
said rotor shaft circumscribing said output shaft.

6. The gearmotor of claim 1,
said rotor shaft position indicium comprising a radially projecting rotor shaft decal,
said output shaft position indicium comprising a radially projecting output shaft decal.

7. The gearmotor of claim 1,
said rotor shaft having a rotor shaft circumference,
said output shaft having an output shaft circumference,
said rotor shaft position indicium extending circumferentially about less than one eighth of said rotor shaft circumference,
said output shaft position indicium extending circumferentially about less than one eighth of said output shaft circumference.

8. The gearmotor of claim 1,
said motor assembly including a stator and a stator retention apparatus,
said stator including a core and a plurality of coils wound about the core,
said core presenting an axial end face,
said stator retention apparatus being disposed axially adjacent said end face to restrict axial shifting of the stator relative to the stator retention apparatus,
said stator retention apparatus including an electronics assembly support structure,
said rotor shaft rotation sensor and said output shaft rotation sensor being mounted to said electronics assembly support structure.

9. The gearmotor of claim 8,
said stator retention apparatus further including an arcuately extending ring portion,
said electronics assembly support structure including an axially projecting platform fixed to said ring portion,
said axially projecting platform defining transversely spaced apart ends,
each of said ends intersecting said ring portion such that the ring portion circumscribes the axially projecting platform,
said rotor shaft rotation sensor and said output shaft rotation sensor being mounted to said axially projecting platform.

10. The gearmotor of claim 9,
said electronics assembly support structure further including a radially extending platform,
said gearmotor further comprising a second electronics assembly,
said second electronics assembly including a magnetic sensor mounted to said radially extending platform,
said coils cooperatively presenting an axial coil margin,
said core defining a core orientation feature,
said stator retention apparatus including an apparatus orientation feature,
said core orientation feature and said apparatus orientation feature engaging one another to position said stator retention apparatus radially and arcuately relative to said core, such that the magnetic sensor is positioned adjacent said axial coil margin.

11. The gearmotor of claim 8, further comprising:
a motor housing receiving said rotor and said stator,
said ring portion including an arcuately extending, radially outermost face that engages said motor housing such that shifting of the ring portion relative to the motor housing is restricted.

12. The gearmotor of claim 8, further comprising:
a second electronics assembly including a magnetic sensor,
said coils cooperatively presenting an axial coil margin,
said magnetic sensor being mounted to said electronics assembly support structure,
said core defining a core orientation feature,
said stator retention apparatus including an apparatus orientation feature,
said core orientation feature and said apparatus orientation feature engaging one another to position said stator retention apparatus radially and arcuately relative to said core, such that the magnetic sensor is positioned adjacent said axial coil margin.

13. The gearmotor of claim 12,
said core defining a plurality of said core orientation features,
said core including a plurality of arcuately spaced apart teeth,
each of said teeth at least in part defining one of said core orientation features.

14. The gearmotor of claim 13,
said gearmotor including fewer of said apparatus orientation features than said core orientation features, such that the stator retention apparatus is variably arcuately securable relative to the core.

15. The gearmotor of claim 13,
said apparatus orientation feature comprising an axially extending leg,
each of said teeth presenting a pair of arcuately spaced apart, axially extending side faces,
each of said core orientation features comprising an engagement portion one of said side faces,
said leg extending between and engaging each of a facing pair of said engagement portions, wherein said facing pair of said engagement portions is defined by a pair of adjacent teeth.

16. The gearmotor of claim 15,
each of said teeth including a generally radially extending arm and a generally arcuately extending crown,
each of said crowns presenting a pair of arcuately spaced apart, endmost tips,
each of said tips presenting one of said engagement portions.

17. The gearmotor of claim 12,
one of said orientation features comprising an axially extending peg, and the other of said orientation features comprising an axially extending aperture,
said peg being at least in part received in said aperture.

18. The gearmotor of claim 17,
said stator retention apparatus including only one of said pegs.

19. The gearmotor of claim 12,
said stator retention apparatus being integrally molded.

20. The gearmotor of claim 12,
said electronics assembly including a plurality of said magnetic sensors,
each of said magnetic sensors being mounted to said electronics support assembly to be positioned adjacent said axial coil margin and evenly arcuately spaced from one another.

21. The gearmotor of claim 1,
said rotor shaft rotation sensor configured to read the rotor shaft position indicium radially across the radial rotor shaft sensor gap,
said output shaft rotation sensor configured to read the output shaft position indicium radially across the radial output shaft sensor gap.

* * * * *